US008612061B2

(12) United States Patent
Laflamme et al.

(10) Patent No.: US 8,612,061 B2
(45) Date of Patent: Dec. 17, 2013

(54) METHOD AND SYSTEM FOR CONTROLLING A BATHING SYSTEM IN ACCORDANCE WITH AN ENERGY SAVINGS MODE

(75) Inventors: Benoit Laflamme, Quebec (CA); Christian Brochu, Quebec (CA)

(73) Assignee: Gecko Alliance Group Inc., Québec, Québec (CA)

( * ) Notice: Subject to any disclaimer, the term of this patent is extended or adjusted under 35 U.S.C. 154(b) by 498 days.

(21) Appl. No.: 12/916,160

(22) Filed: Oct. 29, 2010

(65) Prior Publication Data

US 2012/0101647 A1  Apr. 26, 2012

Related U.S. Application Data

(60) Provisional application No. 61/405,981, filed on Oct. 22, 2010.

(51) Int. Cl.
*G05D 16/20* (2006.01)
(52) U.S. Cl.
USPC .......................................... 700/295; 700/275
(58) Field of Classification Search
USPC ......... 700/275, 278, 291, 295, 296, 299, 300; 705/412
See application file for complete search history.

(56) References Cited

U.S. PATENT DOCUMENTS

| 4,568,821 A * | 2/1986 | Boe ................................. 219/419 |
| 5,361,215 A | 11/1994 | Tompkins et al. |
| 5,710,409 A | 1/1998 | Schwarzbacker et al. |
| 5,930,852 A | 8/1999 | Gravatt et al. |
| 6,200,108 B1 | 3/2001 | Caudill et al. |
| 6,355,913 B1 | 3/2002 | Authier et al. |
| 6,476,363 B1 | 11/2002 | Authier et al. |
| 6,488,408 B1 | 12/2002 | Laflamme et al. |
| 6,717,050 B2 | 4/2004 | Laflamme et al. |

(Continued)

FOREIGN PATENT DOCUMENTS

| CA | 2430862 | 11/2007 |
| CA | 2324598 | 5/2008 |

(Continued)

OTHER PUBLICATIONS

Newport Controls, LLC, "Azure Control Panel User's Manuel", downloaded from the internet website www.newportcontrols.com on Sep. 27, 2010, Revision Date: Apr. 23, 2010, 37 pages.

(Continued)

*Primary Examiner* — Charles Kasenge

(57) ABSTRACT

A method and device for use in connection with a bathing system that comprises a heating module and a filtration system. The bathing system is adapted to receive power from an energy provider that supplies power in accordance with a power consumption profile. The method comprises receiving an input from a user conveying a desire that at least one of the heating module and the filtration system is operated in accordance with an energy savings mode, and causing the heating module and the filtration system to acquire an actuated state and a non-actuated state on a basis of a usage profile associated with the energy savings mode. The usage profile causes the at least one of the heating module and the filtration system to acquire the actuated state according to a schedule established at least in part on a basis of the power consumption profile.

37 Claims, 12 Drawing Sheets

(56) References Cited

U.S. PATENT DOCUMENTS

| | | | |
|---|---|---|---|
| 6,744,223 B2 | 6/2004 | Laflamme et al. | |
| 6,782,309 B2 | 8/2004 | Laflamme et al. | |
| 6,813,575 B2 | 11/2004 | Laflamme | |
| 6,874,175 B2 | 4/2005 | Laflamme et al. | |
| 6,900,736 B2 | 5/2005 | Crumb | |
| 6,929,516 B2 | 8/2005 | Brochu et al. | |
| 6,942,354 B2 | 9/2005 | Metayer et al. | |
| 7,010,363 B2 * | 3/2006 | Donnelly et al. | 700/19 |
| 7,046,163 B2 | 5/2006 | Macey | |
| 7,112,768 B2 | 9/2006 | Brochu et al. | |
| 7,292,898 B2 | 11/2007 | Clark et al. | |
| 7,327,275 B2 | 2/2008 | Brochu et al. | |
| 7,398,138 B2 | 7/2008 | Emery et al. | |
| 7,419,406 B2 | 9/2008 | Brochu et al. | |
| 7,420,293 B2 * | 9/2008 | Donnelly et al. | 307/34 |
| 7,440,820 B2 | 10/2008 | Gougerot et al. | |
| 7,489,986 B1 | 2/2009 | Laflamme et al. | |
| 7,514,884 B2 | 4/2009 | Potucek et al. | |
| 7,593,789 B2 | 9/2009 | Gougerot et al. | |
| 7,619,181 B2 | 11/2009 | Authier | |
| 7,701,679 B2 | 4/2010 | Brochu et al. | |
| 7,843,357 B2 | 11/2010 | Brochu et al. | |
| 7,982,625 B2 | 7/2011 | Brochu et al. | |
| 8,104,110 B2 | 1/2012 | Caudill et al. | |
| 8,150,552 B2 | 4/2012 | Brochu et al. | |
| 2001/0029407 A1 | 10/2001 | Tompkins et al. | |
| 2004/0117330 A1 * | 6/2004 | Ehlers et al. | 705/412 |
| 2005/0088119 A1 | 4/2005 | Potucek et al. | |
| 2005/0288821 A1 | 12/2005 | Laflamme et al. | |
| 2008/0205865 A1 * | 8/2008 | Lesage et al. | 392/454 |
| 2009/0164049 A1 | 6/2009 | Nibler et al. | |
| 2009/0187499 A1 * | 7/2009 | Mulder et al. | 705/30 |
| 2010/0206869 A1 * | 8/2010 | Nelson et al. | 219/494 |
| 2011/0046805 A1 * | 2/2011 | Bedros et al. | 700/291 |
| 2011/0046806 A1 * | 2/2011 | Nagel et al. | 700/291 |
| 2011/0093099 A1 | 4/2011 | Tran et al. | |
| 2011/0098869 A1 * | 4/2011 | Seo et al. | 700/296 |
| 2011/0202150 A1 | 8/2011 | Tran et al. | |
| 2012/0055419 A1 * | 3/2012 | Beyerle et al. | 122/14.1 |
| 2012/0078426 A1 | 3/2012 | Macey | |

FOREIGN PATENT DOCUMENTS

| | | |
|---|---|---|
| CA | 2483876 | 4/2009 |
| CA | 2349106 | 10/2009 |
| CA | 2442861 | 12/2009 |
| CA | 2521572 | 12/2009 |
| CA | 2361096 | 3/2011 |
| CA | 2467015 | 7/2011 |
| CA | 2730873 | 8/2011 |
| CA | 2492350 | 11/2011 |
| CA | 2357641 | 1/2012 |
| CA | 2412221 | 1/2012 |
| CA | 2499551 | 5/2012 |

OTHER PUBLICATIONS

Office Action issued on Oct. 26, 2012 in connection with U.S. Appl. 12/910,615, 13 pages.

* cited by examiner

METHOD AND SYSTEM FOR CONTROLLING A BATHING SYSTEM IN ACCORDANCE WITH AN ENERGY SAVINGS MODE

CROSS REFERENCE TO RELATED APPLICATIONS

This application claims the benefit under 35 USC §119(e) of U.S. provisional patent application Ser. No. 61/405,981 filed on Oct. 22, 2010. The contents of the above-mentioned patent application are incorporated herein by reference.

FIELD OF THE INVENTION

The present invention relates generally to the field of control systems for controlling various operational settings of bathing unit components of a bathing unit system, and more specifically to control systems for assisting a user in achieving a desired energy efficiency when running the bathing system.

BACKGROUND

A bathing system, such as a spa, typically includes various bathing unit components used in the operation of the bathing unit system such as a water holding receptacle, pumps to circulate water in a piping system, pumps for activating water jets, a heating module to heat the water, a filter system, an air blower, an ozone generator, a lighting system, and a control system for activating and managing the various parameters of the bathing unit components. Other types of bathing units having similar components include, for instance, whirlpools, hot tubs, bathtubs, therapeutic baths, and swimming pools.

In addition to bathing unit components used during the operation of the bathing unit system, features providing added entertainment value are increasingly being included as part of bathing unit systems. Example of such features include lighting elements for providing visual stimulation to the users of the bathing system, and MP3 player docking stations can be included as part of the bathing system. Lighting elements using multicolor LEDs were described in U.S. Pat. No. 6,744,223 entitled "Multicolor lamp system" issued on Jun. 1, 2004 to B. Laflamme et al. The contents of the above document are incorporated herein by reference. Other features include multimedia elements providing audio and/or video functionality. Examples of audio systems for spas have been described in U.S. patent publication no.: US 2002/0025050 A1, entitled "Spa Audio System Operable With A Remote Control" filed on May 24, 2001 by S. S. Macey; in U.S. patent publication no.: 2004/0047484 A1, entitled "Sound system, a speaker assembly, and a method for providing sound for a spa" filed on Sep. 5, 2003 by W. J. Gardenier et al. and U.S. patent publication no.: 2010/0070059 A1, entitled "Bathing unit control system providing multimedia functionality, telephone functionality and/or data network access functionality and bathing unit system including same" filed on Nov. 16, 2009 by B. Laflamme et al. The contents of the above noted documents are incorporated herein by reference.

In an environment in which energy costs are constantly rising, energy efficiency has become increasingly important in the operation of bathing systems. In particular, in various areas of the United States, it has now become common for energy providers to levy different fees for energy consumption depending on whether energy usage is taking place during peak hours and/or off peak hours. It is not uncommon for the cost of energy consumption during peak hours to be several times more than energy consumption during off peak hours. In some areas, peak hour rates are two to three times off peak hour rates. In the context of a bathing system, water heating as well as water filtering are two operating functions that consume a significant proportion of the total energy consumption of the bathing system.

A deficiency with existing control systems is that they do not provide any suitable functionality for allowing the user of the bathing system to easily and conveniently to reduce the energy consumption costs associated with running the bathing system, while still enabling the bathing system to operate in a way that accommodates the timing and operational functionality that is desired by the user.

Against the background described above, it appears that there is a need in the industry to provide a control system that alleviates at least in part the problems some of the deficiencies of existing bathing unit control systems, and provides a more energy efficient operation of the bathing system.

SUMMARY

In accordance with a broad aspect, the invention provides a method for use in connection with a bathing system. The bathing system comprises a set of bathing unit components including a heating module and a filtration system adapted for acquiring an actuated state and a non-actuated state. The bathing system is adapted to receive power from an energy provider that supplies power in accordance with a power consumption profile. The method comprises receiving an input from a user conveying a desire that at least one of the heating module and the filtration system is operated in accordance with an energy savings mode and causing the at least one of the heating module and the filtration system to acquire the actuated state and the non-actuated state on a basis of a usage profile associated with the energy savings mode. The usage profile causes the at least one of the heating module and the filtration system to acquire the actuated state according to a schedule established at least in part on a basis of the power consumption profile.

In accordance with another broad aspect, the invention provides a device for use in connection with a bathing system. The bathing system includes a set of bathing unit components comprising a heating module and a filtration system adapted for acquiring an actuated state and a non-actuated state. The bathing system is adapted to receive power from an energy provider that supplies power in accordance with a power consumption profile. The device comprises an input for receiving a signal indicative that at least one of the heating module and the filtration system is to be operated in accordance with an energy savings mode, a processor in communication with the input for obtaining a usage profile associated with the energy savings mode, the usage profile causing the at least one of the heating module and the filtration system to acquire the actuated state according to a schedule established at least in part on a basis of the power consumption profile. The device further comprises an output for releasing a signal for causing the at least one of the heating module and the filtration system to acquire the actuated state in accordance with the usage profile.

In accordance with another broad aspect, the invention provides a control system suitable for controlling a set of bathing unit components in a bathing system. The bathing system adapted to receive power from an energy provider that supplies power in accordance with a power consumption profile. The control system comprises a user control interface for enabling a user to enter a signal indicative of a desire that at least one of the bathing unit components is operated in accordance with an energy savings mode and a bathing unit controller in communication with the user control interface for receiving an indication of the desire that at least one of the bathing unit components is operated in accordance with an energy savings mode. The bathing unit controller is operative for obtaining a usage profile associated with the energy savings mode. The usage profile is operative for causing the at least one of the bathing unit components to acquire an actuated state according to a schedule established at least in part on a basis of the power consumption profile. The bathing unit controller is further operative for releasing a signal for causing the at least one of the bathing unit components to acquire the actuated state in accordance with the usage profile.

In accordance with another broad aspect, the invention provides a device for use in connection with a bathing system. The bathing system including a set of bathing unit components that comprises a heating module and a filtration system adapted for acquiring an actuated state and a non-actuated state. The bathing system is adapted to receive power from an energy provider that supplies power in accordance with a power consumption profile. The device comprises an input for receiving from a user a selected energy savings mode from a set of energy savings modes including at least two distinct energy savings modes, a processor in communication with the input. The processor being programmed for deriving a usage profile based at least in part on the selected energy savings mode and the power consumption profile. The usage profile causes the at least one of the heating module and the filtration system to acquire the actuated state and the non-actuated state. The device further comprises an output for releasing a signal for causing at least one of the heating module and the filtration system to acquire the actuated state and the non-actuated state based at least in part on a basis of the derived usage profile.

In accordance with another broad aspect, the invention provides a method for use in connection with a bathing system that includes a set of bathing unit components comprising a heating module and a filtration system adapted for acquiring an actuated state and a non-actuated state. The bathing system is adapted to receive power from an energy provider that supplies power in accordance with a power consumption profile. The method comprises receiving a signal indicative of a selected energy savings mode from a set of energy savings modes. The set of energy savings modes including at least two distinct energy savings modes. The method further comprises deriving a usage profile on the basis of which at least one of the heating module and the filtration system are caused to acquire the actuated state and the non-actuated state. The user profile is derived based at least in part on the selected energy savings mode and the power consumption profile. The method further comprises releasing a signal for causing the at least one of the heating module and the filtration system to acquire the actuated state and the non-actuated state on a basis of the derived usage profile.

In accordance with another broad aspect, the invention provides a method for use in connection with a bathing system that comprises a set of bathing unit components. The method comprises receiving, at an input, a signal from a user conveying at least one desired operating parameter associated with a bathing unit component from the set of bathing unit components, determining, at a processor, at least in part on a basis of the at least one desired operating parameter and energy efficiency information an improved-efficiency operating parameter that is suitable for implementation by the bathing unit component and upon determination of the improved-efficiency operating parameter, releasing a signal for causing the user to be advised of the improved-efficiency operating parameter.

In accordance with another broad aspect, the invention provides a device for use in connection with a bathing system comprising a set of bathing unit components. The device comprises an input for receiving from a user, a signal conveying at least one desired operating parameter associated with a bathing unit component, a processor for determining at least in part on a basis of the at least one desired operating parameter and energy efficiency information an improved-efficiency operating parameter that is suitable for implementation by the bathing unit component and an output for releasing a signal, upon determination of an improved-efficiency operating parameter, for causing the user to be advised of the improved-efficiency operating parameter.

In accordance with another broad aspect, the invention provides a non-transient computer readable storage medium for storing computer executable program instructions for execution by a computing unit for implementing a graphical user interface on a display unit. The graphical user interface comprises a first input area for receiving from a user an indication of a desired operating parameter associated with a bathing unit component, a first information area for displaying, in response to the indication of a desired operating parameter, an improved-efficiency operating parameter suitable for replacing the desired operating parameter, the improved-efficiency operating parameter being more efficient in terms of at least one of energy consumption and energy cost and a second input area for receiving from a user an indication that the improved-efficiency operating parameter should be implemented.

In accordance with another broad aspect, the invention provides a device for use in connection with a bathing system that comprises a set of bathing unit components comprising a heating module and a filtration system. The bathing system adapted to receive power from an energy provider that supplies power in accordance with a power consumption profile. The device comprising an input for receiving the power consumption profile and a processor for controlling the set of bathing units at least in part on a basis of the power consumption profile.

In accordance with another broad aspect, the invention provides a method for use in connection with a bathing system that comprises a set of bathing unit components including a heating module and a filtration system adapted for acquiring an actuated state and a non-actuated state. The method comprises receiving an input from a user conveying a desire that at least one of the heating module and the filtration system is operated in accordance with an operational mode and causing the at least one of the heating module and the filtration system to acquire the actuated state and the non-actuated state on a basis of the operational mode. The operational mode causes the at least one of the heating module and the filtration system to acquire the actuated state according to a schedule established at least in part on a basis of a certain criteria.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
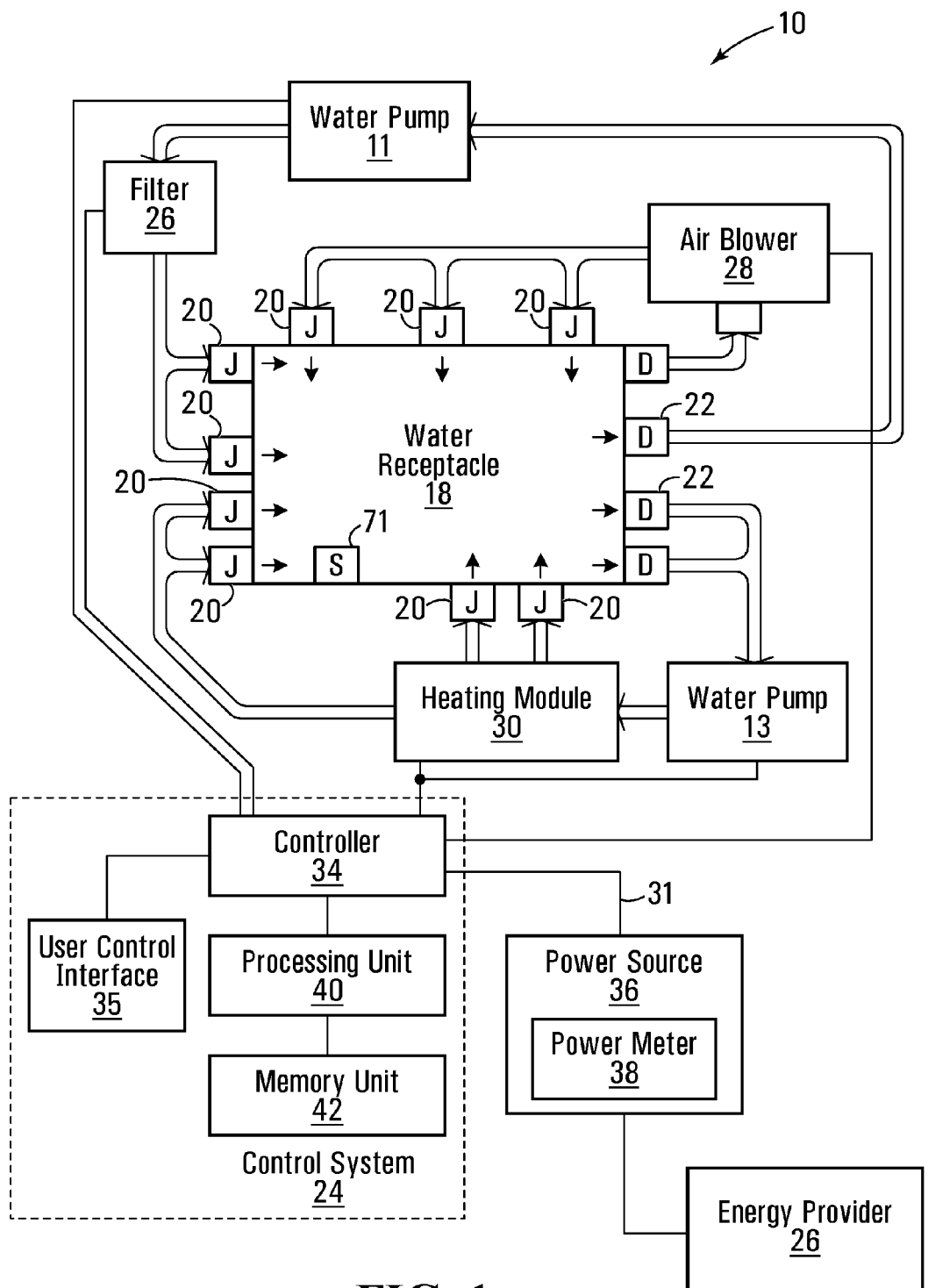
FIG. 1 shows a block diagram of a bathing system equipped with a control system in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a bathing system 10. It is to be understood that the term "bathing system", as used for the purposes of the present description, refers to spas, whirlpools, hot tubs, bathtubs, therapeutic baths, swimming pools and any other type of bathing unit that can be equipped with a control system and associated user control interface for controlling various operational settings of the bathing unit components.

FIG. 1 illustrates a block diagram of a bathing system 10 in accordance with a non-limiting example of implementation of the present invention. The bathing system 10 includes a water receptacle 18 for holding water, a plurality of water jets 20, a set of drains 22 and a control system 24. In the specific embodiment shown, the bathing system 10 further includes a set of bathing unit components comprising a heating module 30, two water pumps 11 and 13, a filter 26 and an air blower 28. It should be understood that the bathing system 10 could include more or less bathing unit components without departing from the spirit of the invention. For example, although not shown in FIG. 1, the bathing system 10 could include an ozonator, a lighting system for lighting up the water in the receptacle 18, multimedia devices such as an MP3 player, a CD/DVD player as well as any other suitable device.

In the non-limiting embodiment shown, the control system 24 includes a controller 34 for controlling the set of bathing unit components 11, 13, 26, 28, 30 and a user control interface 35 for enabling a user to enter user commands to the controller 34. The user control interface 35 may be located locally as part of the control system 24, as shown in FIG. 1, or alternatively, the user control interface 35 may be part of a remote computing device that allows a user to communicate with the controller 34 remotely. A remote user control interface 35 may be able to communicate with the controller via RF signal, infrared signals, or via a network communication (over an Intranet or the Internet). The user control interface 35 can comprise a display screen for displaying a graphical user interface (which will be described in more detail below) and one or more user input devices, which can also be referred to as a user operable inputs. The user input devices can include a trackball, mouse, gyroscope remote (which senses movement of the device in the air so as to move a cursor), a keypad, a touch sensitive screen, turn-dials, turn-and-push dials (such as idrive from BMW), a stylus pen or a microphone, among other possibilities. One or a combination of these input devices can be included as part of the user control interface 35.

As such, the user control interface 35 provides an interface for allowing a user to enter commands for causing the controller 34 to control the various operational settings of the bathing unit components 11, 13, 26, 28, 30. Some non-limiting examples of operational settings include temperature control settings, jet control settings, and lighting settings, among other possibilities. Where the bathing unit is connected to entertainment and/or multimedia modules, the operational settings of the bathing unit may also include audio settings and video settings, amongst others. Consequently, the expression "operational settings" or "operating parameters", for the purpose of the present invention, is intended to cover operational settings for any suitable bathing unit component or components that can be operated by a user of the bathing unit system.

In normal operation, water flows from the bathing unit receptacle 18, through the drains 22 and is pumped by water pump 13 through the heating module 30 where the water is heated. The heated water then leaves the heating module 30 and re-enters the bathing unit receptacle 18 through jets 20. In addition, water flows from the bathing unit receptacle 18, through different drains 22 and is pumped by water pump 11 through filter 26. The filtered water then re-enters the bathing unit receptacle 18 through different jets 20. Water can flow through these two cycles continuously while the bathing unit system 10 is in operation. Optionally, water can also flow from the bathing unit receptacle 18 through one or more drains 22 to an air blower 28 that is operative for delivering air bubbles to water that re-enters the bathing unit receptacle 18 through jets 20.

As shown in FIG. 1, the controller 34 includes a processing unit 40 and a memory unit 42 that are in communication with one another over a communication bus. The processing unit 40 is operative for accessing and processing program instructions and data stored within the memory unit 42 for enabling the controller 34 to control the set of bathing unit components 11, 13, 26, 28 and 30 at least in part on the basis of those program instructions and/or inputs received from a user via the user control interface 35. A specific manner in which the controller 34 can control the bathing unit components 11, 13, 26, 28 and 30 on the basis of specific program instructions and data stored in the memory unit 42 in order to render the bathing system 40 more energy efficient will be described in more detail below.

The control system 24 receives electrical power from an electric power source 36 that is connected to the controller 34 via service wiring 31. The power source 36 supplies the controller 34 with any conventional power service suitable for residential or commercial use. The controller 34 then controls the distribution of power to the various bathing unit components 11, 13, 26, 28, 30 on the basis of program instructions and signals received from the user control interface 35 in order to cause any desired operational settings to be implemented. The controller 34 may also receive control signals from various sensors 71 in order to cause the desired operational settings to be implemented. The controller 34 can be used to control the individual bathing unit components of the bathing unit system, such as for example the water jets 20, the drains 22, the heating module 30, the water pumps 11 and 13, the filter 26 and the air blower 24. The controller 34 may further control additional bathing unit components, such as a valve jet sequencer for massage, a variable speed pump with a pre-programmed massage setting, a water fall, an aroma therapy device and an atomizer, as well as any lighting and multimedia components. Traditional manners in which the controller 34 is able to control these bathing unit components are well known in the art and will not be described in further detail herein as they are not critical to the invention.

In a non-limiting implementation, the power source 36 can supply 240 volts (V) AC to the controller 34 via service wiring 31. In an alternative non-limiting implementation, the power source 36 can supply 120 volts (V) AC to the controller 34 via service wiring 31. In yet a further alternative non-limiting implementation, the power source 36 can supply 120 Volts and 240 Volts AC to the controller 34 via service wiring 31. It is to be appreciated that other voltage supply values or voltage supply combinations, for example depending on geographical location, are possible without detracting from the spirit and scope of the invention. In a non-limiting implementation, the service wiring 31 is passed through a ground fault circuit interrupter (GFCI) that is adapted for tripping in the presence of a current leakage to the ground. The ground fault circuit interrupter (GFCI) provides an added safety measure to the bathing unit system.

The Power Meter 38 and Power Consumption Profiles

The power source 36 is in communication with a power meter 38 that is adapted for measuring the amount of power being consumed by a residence, a business or an individual electrically powered device (such as the bathing system 10). The power meter 38 may be dedicated to measuring the power consumption of the bathing system 10, or the power meter 38 may be suitable for measuring the entire power consumption of a residence or business that has installed the bathing system 10. The power meter 38 may be an analog rotating meter, a digital meter or a smart meter, among other possibilities. It should be appreciated that the type of power meter is not critical to the present invention, and that any type of power meter known in the art can be used in order to implement the present invention.

The power meter 38 that is in communication with the power source is operative to measure the power being consumed by a device, residence or business over a period of time. This energy consumption is usually measured in Kilo-Watt hours (KWH) or SI megajoules. Using various known measurement techniques, the power meter 38 is able to determine the power consumption drawn from the power source and the amount of power usage/consumption that occurs during a given interval of time.

The power source 36 is provided by an energy provider 26 such as HydroQuebec, the New York Power Authority, the Los Angeles Department of Water and Power, or any other energy provider capable of providing residential, business or industrial power. It is the energy provider 26 that receives power consumption readings from the power meter 38 and is able to invoice the user for his/her associated energy consumption. The energy consumption is derived on the basis of readings from the power meter 38 which can be communicated to the energy provider 26 directly by the power meter 38 (in the case of a Smart Meter that is in communication with the energy provider 26 via a communications network) or can be provided to the energy provider 26 by the user via telephone, mail or over the Internet.

It is fairly common for energy providers 26 to charge customers different energy tariff rates during different time periods (usually different times of the day) to better reflect the costs of power generation and transmission. Since it is typically not cost effective to store significant amounts of electricity during a period of low energy demand for use during a period of high energy demand, costs can vary significantly so as to charge higher tariff rates at peak load periods and lower tariff rates at off-peak load periods. As such, a customer of the energy provider 26 may be charged different tariff rates depending on the time of day (ToD) or seasonal time of day (SToD) during which energy is being consumed.

In certain domestic/residential cases, a variable-rate meter will permit two to three tariffs ("peak", "off-peak" and "shoulder") rates to be applied to the energy consumption. In such variable-rate meters, a simple electromechanical time switch may be used. However, it should be appreciated that multiple different types of power meters 38 can be used in accordance with the present invention, provided that they are able to provide an indication of the power being consumed by a given device, residence or business, during different intervals of time.

Time of Day (TOD) metering normally splits tariff rates into two segments, peak and off-peak, with peak typically occurring during the day (usually non-holiday days), such as from 1 pm to 9 pm Monday through Friday during the summer and from 6:30 am to 12 noon and 5 pm to 9 pm during the winter. Obviously, the times of peak demand/cost will vary in different markets around the world, and can be quite geographically specific.

For the purposes of the present description, the energy provider 26 will be described as supplying power according to an power consumption profile. It is the power consumption profile that defines different energy tariff rates in relation to respective time periods (such as time of day, or seasonal time of day). In accordance with a specific example, the power consumption profile may define a "peak" tariff rate and an "off-peak" tariff rate, wherein the peak tariff rate will be higher than the off-peak tariff rate. The power consumption profile may also define a "shoulder" period that has a tariff rate that is somewhere between the peak tariff rate and the off-peak tariff rate. It is possible for the power consumption profile to have any number of different tariff rates according to time of day, time of week, time of month or season, among other possibilities.

Figure 2A:
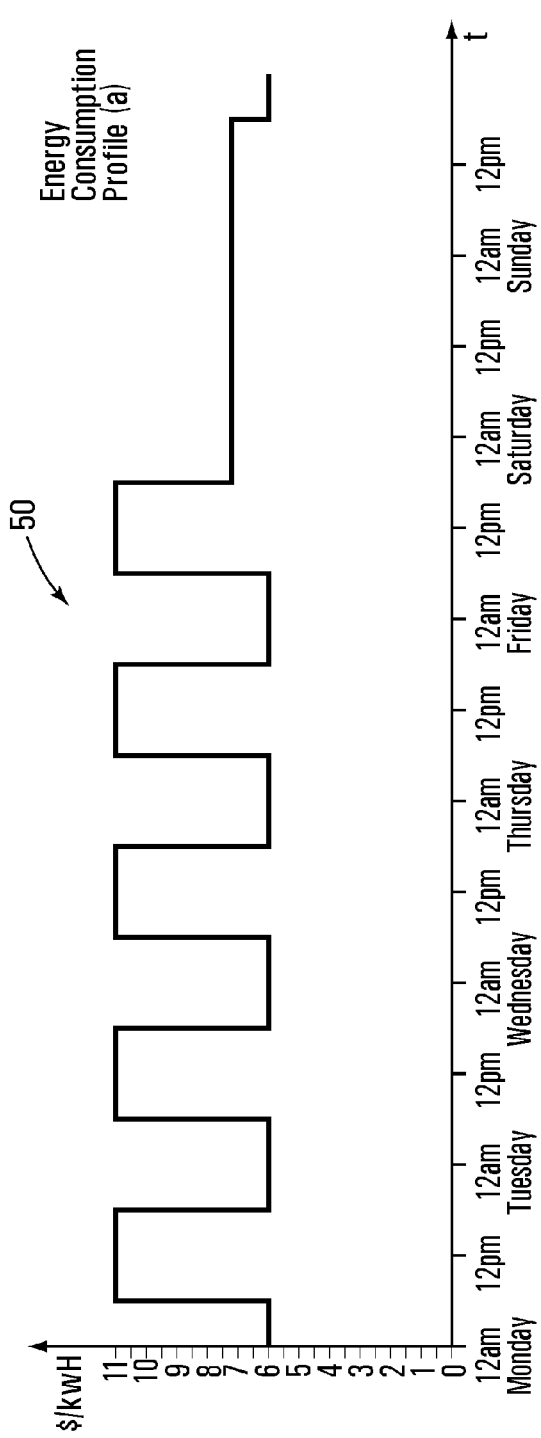
FIGS. 2a and 2b show two non-limiting representations of power consumption profiles that can be used in conjunction with the present invention.
Figure 2B:
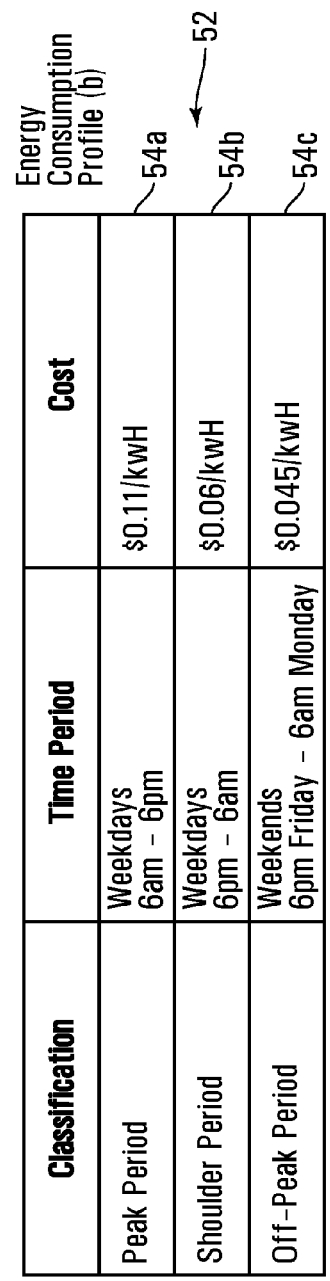

Shown in FIGS. 2a and 2b are two non-limiting representations of power consumption profiles that could be used by the energy provider 26. FIG. 2a shows a graphical representation 50 of the power consumption profile that graphs the time periods during which the energy tariff rate is different. The energy tariff rate between approximately 6 am to 6 pm during the weekdays is that of a peak period, the energy tariff rate between 6 pm on Friday and 6 am on Monday is that of an off-peak period, and the energy tariff rate between 6 pm and 6 am during the weekdays is a shoulder period. FIG. 2b shows a table or spreadsheet representation 52 of the same power consumption profile. The table 52 includes a plurality of entries 54a-c that each provides a cost associated with a different period of time; namely the peak period, the off-peak period and the shoulder period. It should be appreciated that the time periods and energy tariff rates shown in FIGS. 2a and 2b are strictly for example, and do not limit the invention in any way.

As mentioned above, it is generally the energy provider 26 that will establish the power consumption profile. A given power consumption profile being used by an energy provider may stay the same for a long period of time (such as a few years) or may fluctuate on a fairly regular basis as a result of various external factors that could cause the load demand to increase or decrease during different time periods, or that could cause the cost of generating power to change. Accordingly, the power consumption profile may change monthly, seasonally, yearly, or at completely random intervals. As will be described in more detail below, the control system 24 may be in communication with an centralized database via a network connection, in order to obtain recent updates to the power consumption profile.

In accordance with the present invention, the controller 34 is operative for acquiring an energy savings mode for controlling, in an energy efficient manner, the bathing unit components and particularly the heating module 30 and the filtration system 26, which consume a significant portion of the overall energy consumption of the bathing system 10. More specifically, the energy savings mode causes the bathing system controller 34 to control the bathing unit components in a way that takes into consideration the power consumption profile of the energy provider 26, and specifically the time periods during which energy tariff rates are less expensive. In this manner, the controller 34 is able to control the bathing unit components in such a way that is biased toward consuming energy during the non-peak time periods, or at the very least, not during the peak time periods. By favoring off-peak time periods for heating and/or filtration operations, or other bathing unit component operations, the total energy cost of operating the bathing system can be reduced. A more detailed explanation of different possible energy savings modes, and the manner in which the controller 34 is able to control the bathing unit components in a more energy efficient manner in accordance with these energy savings modes, will be described in more detail below.

Energy Savings Modes

Figure 3:
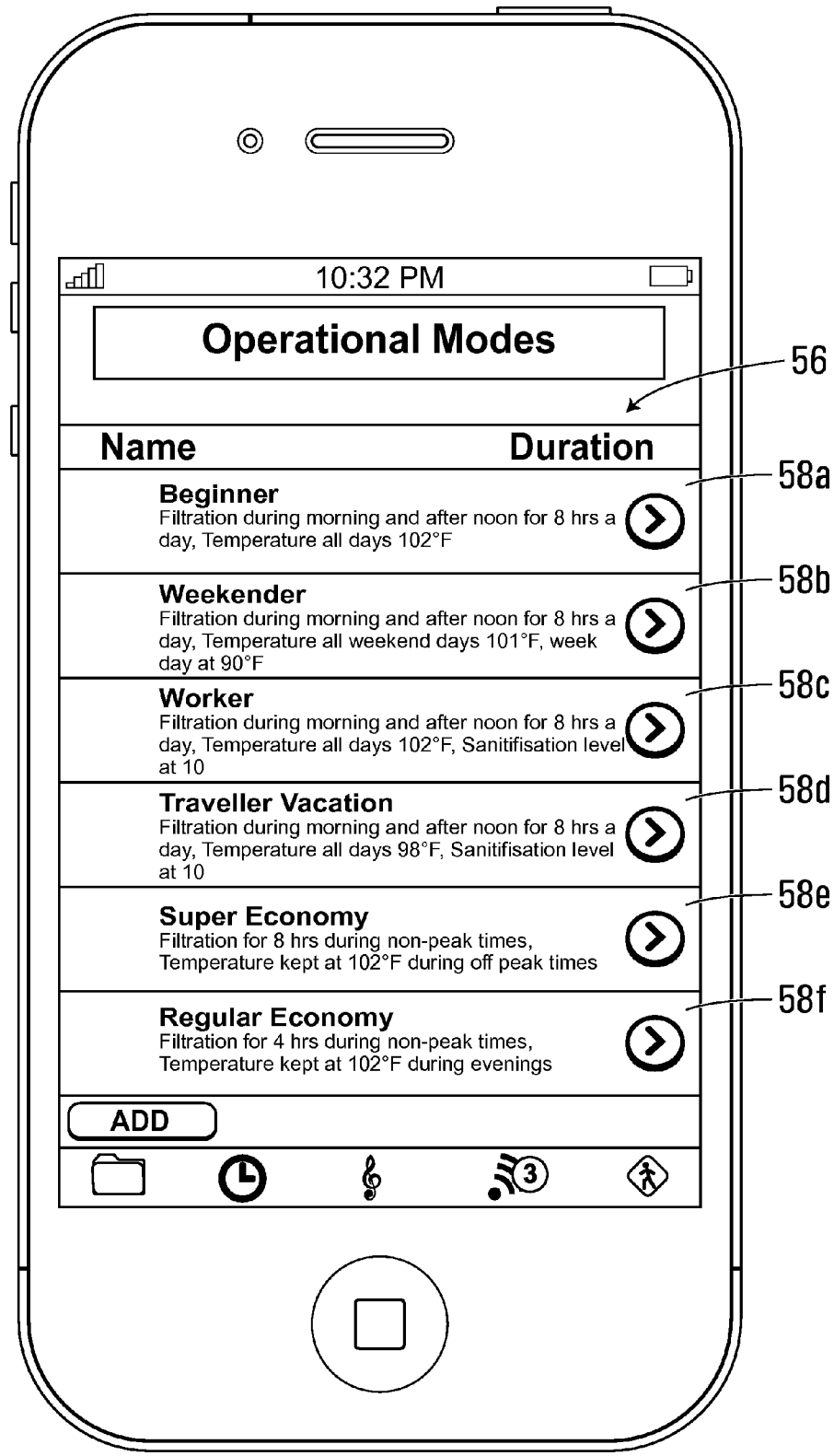
FIG. 3 shows a non-limiting example of a graphical user interface showing a selection of operational modes in accordance with the present invention.

Shown in FIG. 3 is a non-limiting example of a graphical user interface 56 suitable for enabling a user to provide a signal indicative of a desired operational mode for controlling the bathing unit components. The graphical user interface 56 displays a set of operational modes 58a-f that can be selected by a user for causing the controller 34 to control the operation of the bathing unit components in accordance with one or more operating parameters that are associated with the selected operational mode. The operational modes shown in FIG. 3 include operational modes suitable for different circumstances, as well as two energy savings operational modes.

The particular display page of the graphical user interface 56 shown in FIG. 3 can be displayed on a display screen of the user control interface 35, such that it can be viewed by a user of the bathing system 10. In addition to the graphical user interface 56 that will be described herein, the display screen is further operative to display to a user information about the bathing unit components in the bathing unit system 10 and provide a menu driven interface that can be navigated by using one or more user input devices of the user control interface. More specifically, the user control interface 35 can provide the user with control of a number of bathing unit components including, without being limited to, multimedia functionality, telephony functionality, internet browsing functionality and the regulation of the operation of the bathing unit components, amongst others. In order to allow the user to control these various components, the user control interface 35 provides a menu driven interface displayed on one or more display pages for allowing the user to select the components or functionality that the user wishes to control. The user control interface 35 further comprises one or more user input devices that can be used by a user in order to scroll through and select options offered by the graphical user interface displayed on the display screen.

The user control interface 35 can be part of the control system 24, as shown in FIG. 1, such that it is in proximity to the bathing system 10. In such a case, the user control interface 35 may be located on the top-side of a bathing unit receptacle so as to be accessible to a user positioned within the bathing unit receptacle, on an exterior panel of the bathing unit receptacle or in a location remote from the bathing unit receptacle. When the user control interface 35 is located remotely from the bathing unit receptacle, it may be mounted on a wall (for example in or outside a house) or it may be integrated in a free standing structure that can be positioned on a surface in proximity to the bathing unit receptacle. The user control interface 35 shown in FIG. 1 may be in communication with the bathing unit controller 30 over a wired communication link or a wireless link, such as an RF or infrared link, among other possibilities.

Alternatively, instead of being included as part of the bathing unit control system 24, the user control interface 35 may be included within a remote computing device 72 that is in wireless connection with the controller 34, either directly or via a network connection. The remote computing device 72 could be in RF or infrared communication with the controller 34, or more likely, the remote computing device 72 will be in communication with the controller 34 via a network connection. The network connection can be any type of connection, such as a WiFi connection, zigbee connection, home network connection, Internet connection, wimax connection and plc (power line communication).

The remote computing device that implements the user control interface 35 for displaying to a user a graphical user interface, such as the one that will be described herein, may be any type of computing device known in the art. For example, the remote computing device may be a personal computer such as a desktop or laptop computer, or a portable hand-held computing device, such as a PDA, a cell phone, a smart phone (such as a Blackberry™ or an iPhone™), or a web-enabled computing device, such as an iTouch™, iPad™ or computer Tablet, among other possibilities. The drawings included within the present document show the graphical user interface as being displayed on a remote computing device that is in the form of an iPhone. However, the invention is certainly not limited to this implementation.

Regardless of whether the user control interface 35 for displaying the graphical user interface is located in proximity to the bathing unit receptacle 18 or is located within a remote computing device, it is to be understood that the functionality of the user control interface 35 could be implemented by any suitable hardware and/or hardware/software combination without departing from the spirit and scope of the present invention. In a non-limiting example, the user control interface 35 includes a microprocessor.

Referring back to FIG. 3, the graphical user interface 56 that is displayed by the display screen of the user control interface 35, displays a set of operational modes 58a-f that can be selected by a user. In the non-limiting example shown, the set of operational modes comprises a "beginner" mode 58a, a "weekender" mode 58b, a "worker" mode 58c, a "traveler/vacation" mode 58d, a "Super Economy" mode 58e that is a first energy efficiency mode and a "Regular Economy" mode 58f that is a second energy efficiency mode. Each of these modes is associated with at least one operating parameter for at least one respective bathing unit component, for indicating an operational setting for the bathing unit component as well as a length of operation and a time period during which the bathing unit component will be in an activated state. For example, the "beginner" mode 58a is associated with operating parameters that are indicative that the temperature of the bathing water will be maintained at 102° F. at all times, and that the filtration will be done for 8 hrs a day during the morning and afternoon. The "weekender" mode 58b is associated with operating parameters that are indicative that the temperature of the bathing water will be maintained at 90° F. during the week days and 101° F. during the weekend. This operational mode is also indicative that the filtration will be done for 8 hrs a day during the morning and afternoon.

Additional modes could also be provided, such as a "noise-free nighttime" mode, that may aim to reduce the noise generated by the bathing system after 10 pm, for example. This operational mode may be associated with operating parameters that are indicative that the temperature of the bathing water will be maintained at 102° F. except between 10 pm and 6 am, and that the filtration will be done for 8 hrs a day during the morning and afternoon, such that it does not occur during the night. In addition, this operational mode may prevent the water jets from being operated after 10 pm. Therefore, according to this operational mode, at least the filtration system 26 and heating module 30 that generate a lot of noise are caused to acquire a non-actuated state between 10 pm and 6 am so as to reduce noise during this time period. As such, it should be appreciated that when this operational mode is selected by a user, the operational mode causes at least one of the heating module and the filtration system to acquire the actuated state and the non-actuated state according to a schedule that is established at least in part on a basis of a desire for noise reduction during the night. Other operational modes may cause one or more of the bathing unit components to acquire the actuated and non-actuated states according to a schedule that is established on a basis of other criteria, such as ambient outside temperature and a user schedule, among other possible criteria.

In accordance with the present invention the "Super Economy" and "Regular Economy" modes are energy savings modes that take into consideration the power consumption profile associated with the energy provider 26. Although only two energy savings modes are shown, it should be appreciated that any number of energy savings modes could have been included. Each of the "Super Economy" mode 58e and "Regular Economy" mode 58f comprise different operating parameters, with the "Super Economy" mode 58e being associated with operating parameters that cause greater cost savings or reduced energy consumption in comparison to the "Regular Economy" mode 58f.

In the embodiment shown, the "Super Economy" mode 58e is associated with operating parameters that are indicative that the filtration will be done for 8 hrs a day during non-peak energy consumption times and the temperature of the bathing water will be heated to 102° F. during off-peak time periods. Other operating parameters, such as water jet speed, could also be specified by the "Super Economy" mode 58e. In comparison with the operating parameters of the other operational modes, the "Super Economy" mode 58f is the energy savings mode that is designed to save the most in energy costs for the bathing system user.

The "Regular Economy" mode 58f is designed to reduce energy costs, but not as severely as in the "Super Economy" mode 58f. More specifically, the "Regular Economy" mode 58f is designed to reduce energy costs, while still taking into consideration other operating factors, such as usage patterns, the water temperature desired by a user at a given time of day, noise considerations at certain hours of the day, as well as any other operating parameters that relate to the heating module 30, the filtration system 26 and/or any other ones of the bathing unit components. As such, in the "Regular Ecomony" mode 58e, energy consumption and cost are not the sole factors in determining if and when water should be heated and/or if a filtration operation should be performed. Considerations such as when it is desired to use the spa and/or noise factors associated with filtering of the spa water, as well as the spa user's sensitivity to cost, can also come in to play. In the non-limiting example shown in FIG. 3, the "Regular Economy" mode 58f is associated with operating parameters indicative that the filtration will be done for 7 hrs a day during non-peak energy consumption times, and the temperature of the bathing water will be heated to 102° F. during evenings. As such, energy savings is achieved due to the filtration being performed during off-peak time periods, but the water heating is not restricted to off-peak time periods.

It should be appreciated that different operating parameters from those described above can be associated with the different operational modes. However, when implementing the operating parameters for the energy savings modes, the bathing system 10 will do so in a way that is biased towards causing one or more bathing unit components, and particularly the heating module 30 and the filtration system 26, to acquire an actuated state during the non-peak time periods, or at the very least, not during the peak time periods.

Controlling the Bathing Unit Components in Accordance with an Energy Savings Mode The operating parameters associated with the different operational modes 58a-f shown in FIG. 3 can be pre-programmed in association with a given operational mode by the manufacturer of the bathing system, by a third party offering the operational modes over a network connection (as will be described below) or the operating parameters can be programmed by a user of the bathing system.

For the purposes of the present description, let us assume that the user selects, the "Super Economy" mode 54e displayed on the graphical user interface 56 by using the user control interface 35. By selecting the "Super Economy" mode 54e, the controller 34 receives a signal conveying the user's desire that certain bathing unit components are operated in accordance with the "Super Economy" mode 54e, which is one of the energy savings modes.

In order to control the bathing unit components in accordance with the energy savings mode, the controller 35 causes the bathing unit components to acquire an actuated state and a deactivated state in accordance with a usage profile that is associated with the selected operational mode. It is the usage profile that provides the controller 34 with an indication of the timing for causing the bathing unit components to acquire the actuated and non-actuated states.

The usage profile for a given energy savings mode can be pre-programmed and stored within the memory unit 42 of the control system 24, or the usage profile can be derived by the processing unit 40 as will be described in more detail below. However, in either case, the usage profile for an energy savings mode (the "Super Economy" mode, the "Regular Economy" mode, or any other possible energy savings mode) provides a schedule for causing certain ones of the bathing unit components to acquire an actuated state and a non-actuated state, that is established at least in part on the basis of an power consumption profile associated with the energy provider 26.

Figure 4:
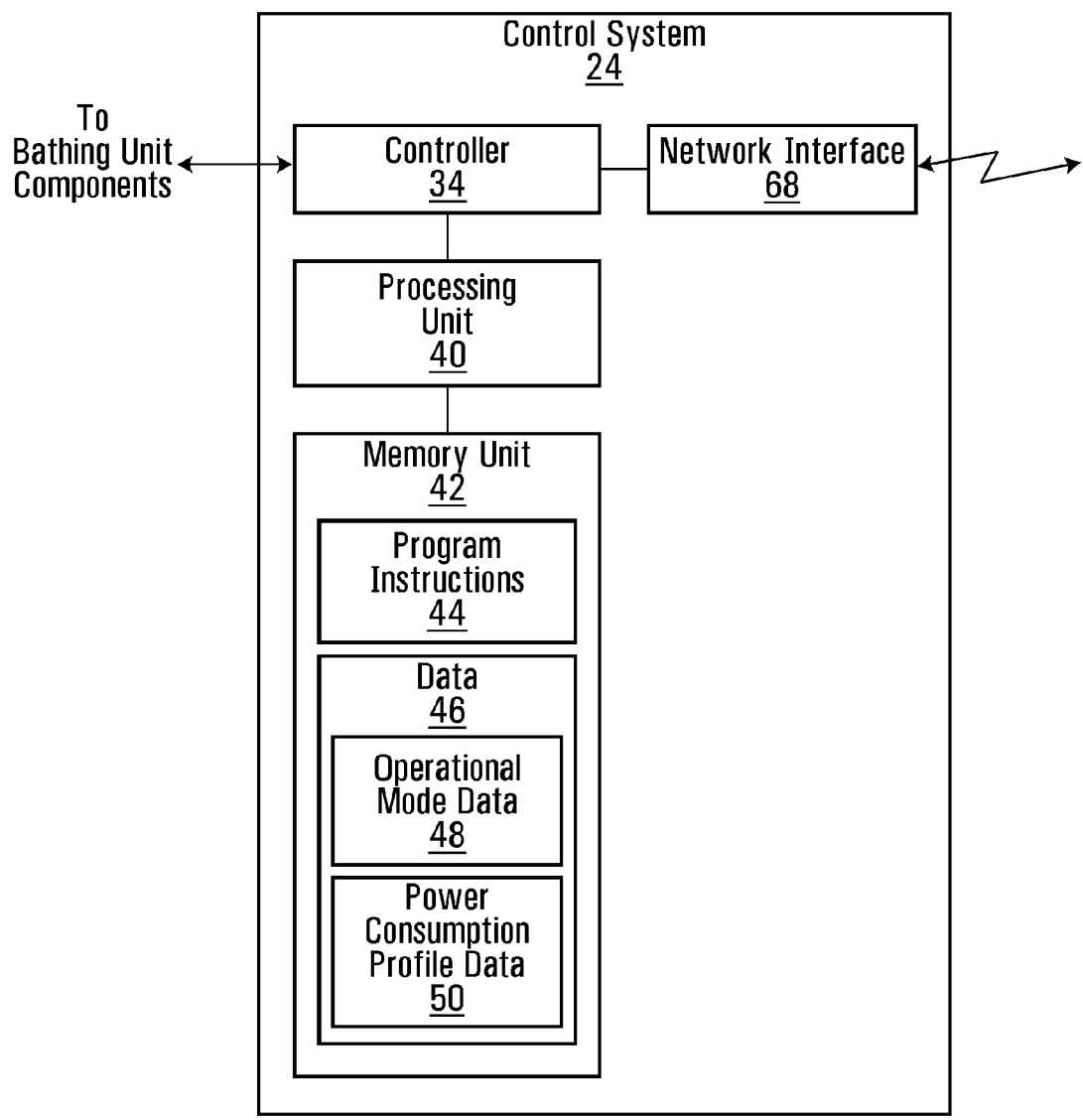
FIG. 4 shows an expanded block diagram of the control system of FIG. 1 in accordance with a specific example of implementation of the present invention.

Shown in FIG. 4 is an expanded non-limiting block diagram of the bathing unit control system 24, which shows the controller 34, the processing unit 40 and the memory unit 42. Included within the memory unit 42 are program instructions 44 and data 46. The processing unit 40 is operative for processing the program instructions 44 and the data 46 stored in the memory unit 42 in order to implement at least some of the functionality described herein. In the non-limiting embodiment shown, stored within the data 46 of the memory unit 42 is operational mode data 48 and power consumption profile data 50. It should, however, be appreciated that one or both of the operational mode data 48 and the power consumption profile data 50 can be stored separately from the control system 24. For example, they can be stored at a network entity, such as a network server, or in the case of the power consumption profile data 50, this data may be stored at the power meter 38. In the case where the operational mode data 48 and the power consumption profile data 50 are stored apart from the control system 24, they may be associated with their own processing unit that is able to communicate with processing unit 40 in order to transfer information regarding the operational mode data 48 and the power consumption profile data 50 to the processing unit 40.

In the case where the operational mode data 48 and the power consumption profile data 50 is stored within the memory unit 42 of the control system 24, this information may be stored within the memory unit 42 by the manufacturer of the bathing system 10 or can be obtained by the control system 24 from a remote entity via a network connection, and then subsequently stored within the memory unit 42. For this reason, the control system 24 shown in FIG. 4 comprises a network interface 68 for enabling the control system 24 to send and receive information over a network connection.

Figure 5:
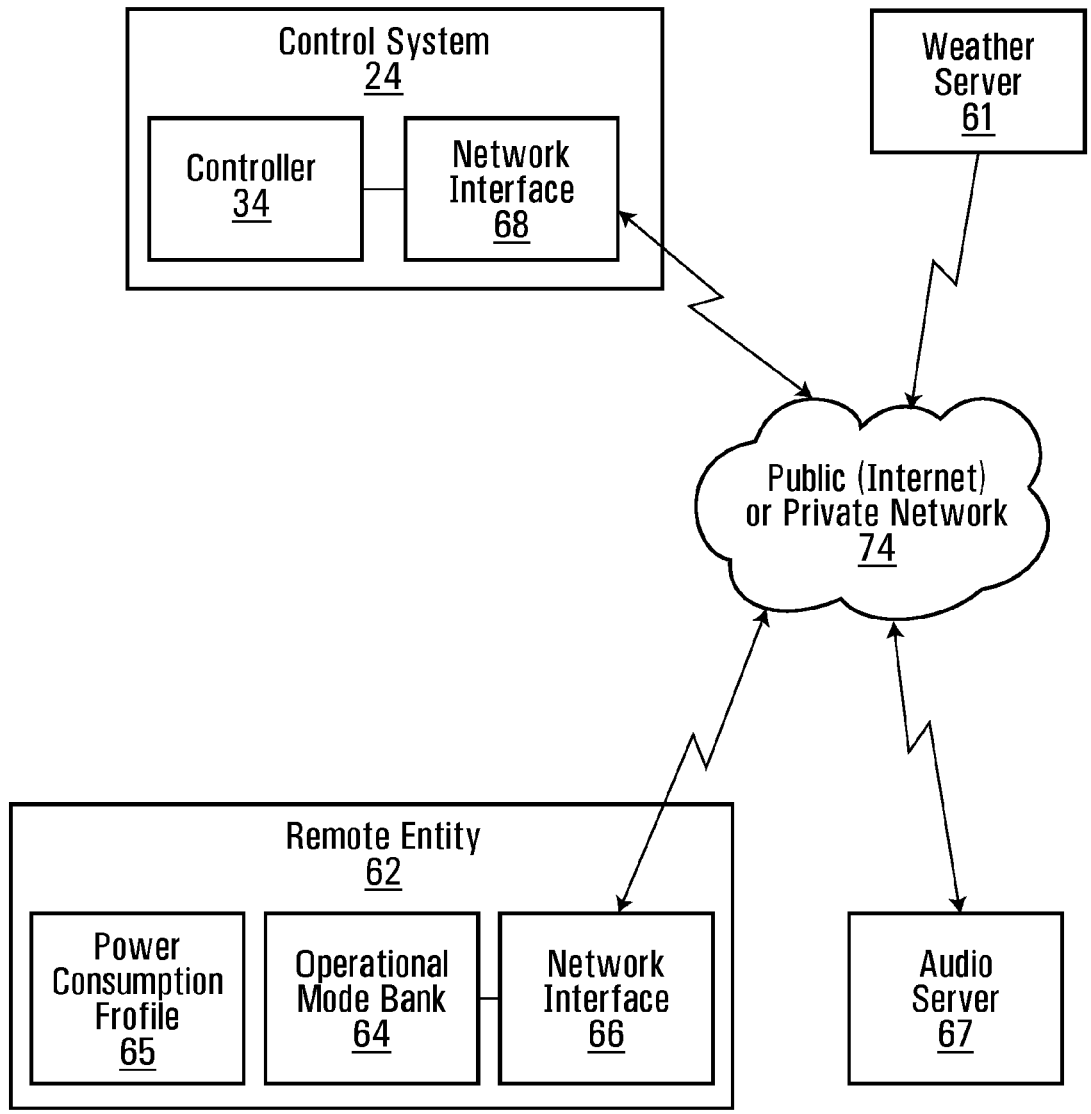
FIG. 5 shows a block diagram of the bathing control system in accordance with a non-limiting example of the present invention and a remote entity in communication with each other via a network connection.

Shown in FIG. 5, is a non-limiting block diagram of the control system 24 in communication with a remote entity 62 over a network connection. Although the control system 24 is shown in FIG. 5, it should be appreciated that in the case where the user control interface 35 is remote from the control system 24, it may be the user control interface that is in network communication with the remote entity 62. The remote entity 62 comprises a network interface 66 for enabling the remote entity 62 to communicate with other devices over the network 74.

In the non-limiting example shown, stored at the remote entity 62 is an operational modes bank 64 and a power consumption profile 65. Although in FIG. 5 the operational modes bank 64 and the power consumption profile 65 are located at the same remote entity 62 it should be appreciated that they could be located at different remote entities. In addition, the data stored within the operational modes bank 64 and within the power consumption profile 65 may be located in a single network location, or may be spread out over multiple remote entities, such as multiple network servers.

In accordance with a non-limiting example, the operational modes bank 64 may be located at a network server operated by the bathing system manufacturer for enabling a user to obtain new and updated operational modes. The operational modes could be downloaded to the control system 24 in the same way that an MP3 music file could be downloaded. The control system 24 (or the user control interface 35 in the case where the user control interface 35 is remote from the control system 24) may be in communication with the network server that stores a plurality of different operational modes (with associated operational mode data) that can be downloaded, or otherwise delivered to the control system 24 (or user control interface 35) over the network 74. A user of the bathing system 10 can thus obtain new operational modes, which could be provided by the spa manufacturer or any other third party. The new operational modes downloaded from the operational modes bank 64 can then be stored as part of the operational modes data 48 within the memory unit 42 of the control system 24.

Likewise, the power consumption profile 65 may be located at a remote entity 62, such as the power meter 38, or at a network server operated by the energy provider 26 for enabling a user to obtain new and updated power consumption profile information. Given that power consumption profiles may change over time, and may vary from one geographic area to the next, information regarding updates and changes to peak and off-peak hours, as well as peak and off-peak hours for different geographical locations, can be stored at a centralized database accessible over a network connection. An advantage of having a centralized database in network communication with the controller 34 is that should the peak and off-peak hours change subsequent to the configuration of the bathing system 10, the information can be updated in the bathing system so that energy usage would be optimized according to these updated factors. This network communication could be done via zigbee, plc (power line communication), wimax or wifi.

In an alternative embodiment, since the utility company can change their power consumption profile overtime (which could cause a change in when the peak, non-peak and shoulder periods occur), it may be the power meter 38 that sends a signal directly to the control system 24 in order to alert the control system 24 as to when a change in different energy consumption periods will occur. Such a signal may be sent from the power meter 38 to the control system 24 when the energy provider 26 changes/updates the power consumption profile. Alternatively, such a signal may be sent each time a change in a given energy consumption period occurs. For example, a signal may be sent when the peak energy consumption period starts, another signal may be sent when the peak energy consumption period ends and an off-peak energy consumption period starts and then another signal may be sent when the off-peak energy consumption period ends and a shoulder energy consumption period begins. As such, the control system 24 is only aware of the current energy consumption period. It should be appreciated that the information that is received by the control system 24, and in some cases stored within the memory unit 42, may convey only information regarding the nature of the consumption period (for example, whether the control system is operating in a peak period or a non-peak period). As such, the control system 24 would not receive information regarding the actual energy tariff rate in effect.

The control system 24 of the bathing system 10 (or a remote computing device in the case where the user control interface 35 is located at a remote computing device) can also be in communication with an audio server 67 for receiving internet radio, the ability to download mP3s or any other type of streaming audio for facilitating ambiance. The audio server 67 may also be able to provide video streaming to the control system 24 over the network 74.

In addition, the control system 24 (or remote user control interface 35) is in communication with a weather server 61 via the network 74, such that the control system 24 (or user control interface 35) is able to receive up-to-date weather information. This information may be used in order to control different functionalities of the bathing system, such as water heating and filtration. One of the operational modes shown in FIG. 3, may be a "temperature-based" operational mode, wherein the operation of the heating module and the filtration is determined on a basis of the current outdoor temperature. For example, if it is a hot summer day, the controller 34 may prevent the heating module 34 from heating the water so as to avoid an over-heated condition by reducing the number of hours of filtration. It is well know that a pump may produce kinetic heating that will heat the water. From an energy efficiency standpoint, in the case where the weather is indicative of a very cold outside temperature, it may be desirable to wait until an off-peak energy tariff rate is in effect before commencing the heating of the water, since a significant amount of energy may be required.

Referring back to FIG. 4, the operational mode data 48 comprises information such as the title of the operational mode and one or more operating parameters associated with the operational mode. The operational mode data 48 may also comprise data relating to the usage profile associated with the operational mode. As mentioned above, the usage profile enables the controller 34 to cause one or more of the bathing unit components to acquire an actuated state and a non-actuated state in accordance with the operating parameters of the operational mode. A non-limiting example of the information contained within the operational mode data 48 is illustrated in the below table:

TABLE 1

Operational Mode Data

| Operational Mode Name | Operating Parameters | Usage Profile (Optional) |
|---|---|---|
| Beginner Mode 58a | Temperature = 102° F. at all times<br>Filtration = 8 hrs/day (morning and afternoon) | Heating Pump - activate at 12 am, deactivate at 1 am, activate at 2 am, deactivate at 3 am, activate at 4 am, etc . . .<br>Filtration - activate at 6 am, deactivate at 10 am, activate at 2 pm, deactivate at 6 pm. |
| Weekender Mode 58b | Temperature = 101° F. Weekends and 90° F. Weekdays<br>Filtration = 8 hrs/day (morning and afternoon) | Heating Pump - During the weekends, activate for one hour every second hour, and maintain at 101° F.<br>During the weekdays, activate for one hour every 3 hours and maintain at 90° F.<br>Filtration - activate at 6 am, deactivate at 10 am, activate at 2 pm, deactivate at 6 pm. |
| . . . | | |
| Super Economy Mode 58e | Temperature = 102° F. During Off-Peak Hours<br>Filtration = 8 hrs/day During Off-Peak Hours | Heating Module - Activate for 30 mins and deactivate for 30 minutes between 6 pm and 6 am in order to maintain 102° F. in the water receptacle<br>Filtration - Activate between 8 pm and 12 am and between 2 am and 6 am. |
| Regular Economy Mode 58f | Temperature = 102° F. during the evenings<br>Filtration = 4 hrs/day During Off-Peak Hours | Heating Module - Activate for 30 mins and deactivate for 30 minutes between 6 pm and 11 pm in order to maintain 102° F. in the water receptacle<br>Filtration - Activate between 12 am and 2 am and 4 am and 6 am on weekdays, and between 3 am and 5 am and 7 am and 9 am on weekends |

As mentioned above, the operational modes together with their operating parameters may be pre-programmed by a manufacturer of the bathing system 10 or may be downloaded over a network connection from an operational modes bank.

In yet a further alternative, the graphical user interface displayed via the user control interface 35 may enable a user to program user-defined operational settings associated with an operational mode. In such an embodiment, the user will be able to provide a name and the desired operating parameters for the user-defined operational mode. In accordance with a further non-limiting embodiment, the user may also be able to provide the usage profile by specifying the time periods during which one or more of the bathing unit components should be activated. However, in an alternative embodiment, the processing unit 40 is operative for deriving the usage profile on the basis of the operating parameters provided by the user and a power consumption profile.

Usage Profile

As mentioned above, the controller 34 causes the bathing unit components that are to be operated in accordance with a selected operational mode, to acquire the actuated state and the non-actuated state on a basis of the usage profile. In the case of the energy savings modes, namely the "Super Economy" mode 58e and the "Regular Economy" mode 58f, the usage profile causes the bathing unit components, and particularly the heating module and the filtration system, to acquire the actuated state according to a schedule established at least in part on a basis of the power consumption profile. In particular, the time periods during which the usage profile causes such bathing unit components to acquire the actuated state, are biased towards being scheduled during the off-peak or shoulder time periods of the power consumption profile.

In a non-limiting embodiment, the usage profile causes the bathing unit components that are operated on a basis of one of the energy savings modes to acquire the actuated state only during the off-peak time periods of the power consumption profile, so as to optimize cost savings for those operating parameters. In an alternative non-limiting embodiment, the usage profile causes a majority of the amount of time the bathing unit components are in an actuated state to occur during the off-peak time periods. In this manner, the bathing unit components are operating at a reduced energy tariff rate for the majority of the time they are in an actuated state.

The usage profile may be established in a variety of ways. In a first non-limiting embodiment, they may be pre-programmed by a manufacturer of the bathing system 10 and stored within the operational modes bank 64 of the memory unit 42 in association with an associated operational mode, as shown in Table 1 above. In a further non-limiting embodiment, the usage profiles may be downloaded together with an associated operational mode from a network entity, as described with respect to FIG. 5 above, and then stored within the memory unit 42 of the bathing system 10.

With regards to the usage profiles for the energy savings modes, regardless of whether they have been pre-programmed by a manufacturer of the bathing system 10, or downloaded from a third party over a network connection, these usage profiles cause the bathing unit components to acquire the actuated state and the non-actuated state according to a schedule established at least in part on a basis of a power consumption profile of the energy provider 26. In the case where the usage profiles are pre-programmed, they have been pre-programmed so as to be biased towards causing the bathing unit components to acquire an actuated state during a non peak energy consumption period. One or more programmers establishing the usage profiles for the energy savings modes will be aware of the power consumption profile, and will take it into consideration when programming the usage profiles.

In the case of the energy savings modes, namely the "Super Economy" mode 58e and the "Regular Economy" mode 58f, the usage profiles may not be pre-programmed in association with the operational modes, and instead may be derived by the processing unit 40 at least in part on a basis of the operational mode selected by the user and the power consumption profile data 50. As mentioned above, the power consumption profile data 50 may be pre-programmed into the memory unit 42, or may alternatively be obtained by the control system 24 from a third party (such as the energy provider 26) over a network connection. In this manner, the control system 24 is able to obtain updated power consumption profile data 50. It should be appreciated that the control system 24 may periodically determine, by querying the remote entity 62, if updated power consumption profile data 50 is available, and if so, downloading the updated power consumption profile data 50. Alternatively, the remote entity 62 may push an update to the control system 24 whenever updated power consumption profile data 50 is available.

Given that power consumption profiles may be different for different energy providers 26, and may be different at different geographical locations, it is possible that upon start up of a new bathing system 10 at a customer's premises, the control system 10 automatically downloads, from a network server of a local energy provider, the appropriate power consumption profiles for that energy provider and for the specific geographical location at which the bathing system is being installed.

Method of Deriving a Usage Profile

Figure 6:
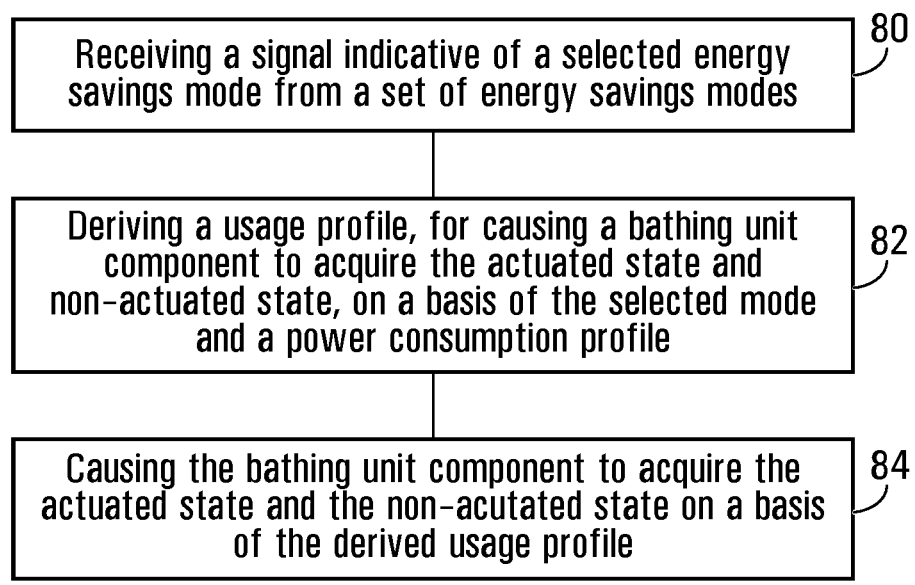
FIG. 6 shows a flow diagram of a method of causing at least one bathing unit component of the bathing system to acquire an actuated and a non-actuated state on a basis of a derived usage profile, according to a non-limiting example of the present invention.

As mentioned above, in the case of the energy savings modes, the usage profiles may be derived by the processing unit 40 at least in part on a basis of the operational mode selected by the user and the power consumption profile data 50. This will now be described in more detail with respect to the flow chart of FIG. 6.

Firstly, at step 80, the processing unit 40 receives a signal indicative of a selected energy savings mode from a set of energy savings modes. In the non-limiting embodiment shown in FIG. 3, the set of energy savings modes comprises the following two distinct energy savings modes, namely the "Super Economy" mode 58e and the "Regular Economy" mode 58f. It should however, be appreciated that other energy savings modes could also be envisaged and included within the set of energy savings modes depicted by FIG. 3.

For the sake of example, let us assume that a user chooses to select the "Super Economy" mode 58e from the set of energy savings modes displayed via the graphical user interface 56 on the display screen of the user control interface 35. The user operates the user input devices of the user control interface 35 to input his/her selection. Once the user has indicated his/her selection, the processing unit 40 receives a signal indicative that the user has selected the "Super Economy" mode 58e.

At step 82, upon receipt of the signal indicative of the selected "Super Economy" mode 58e, the processing unit 42 then derives a usage profile at least in part on a basis of the selected energy savings mode, and specifically the operating parameters associated with the selected energy savings mode, and the power consumption profile. For example, in the case of the "Super Economy" mode 58e, the operating parameters associated with this energy savings mode are as follows:

Temperature=Heat to 102° F. during Off-Peak hours

Filtration=8 hrs/day during Off-Peak hours

The processing unit 40 will then access the power consumption profile data 50 stored in the memory unit 42, and will process the operating parameters of the selected energy savings mode on a basis of the power consumption profile data 50, in order to derive a usage profile. The usage profile will be derived such that it causes the bathing unit components having operating parameters specified by the energy savings mode to acquire the actuated state and the non-actuated state in a way that is biased towards causing the actuated states to occur during non-peak time periods, while still meeting the operating parameters specified by the "Super Economy" mode 58e.

In the example shown, the operating parameters require that the temperature of the water is maintained at 102° F. during Off-Peak hours and that the filtration occurs for 8 hrs/day during Off-Peak hours. The processing unit 40 will thus consider the power consumption profile data 50, which may be indicative that non-peak hours are between 6 pm and 6 am during the weekdays, for example, and then generate a usage profile that is able to cause the filtration to be actuated for 8 hrs a day between 6 pm and 6 am, and that will maintain the temperature at 102° F. during these same hours. As a non-limiting example, the processing unit 42 may derive a usage profile that causes the filtration system to be in an actuated state between 8 pm and 12 am, and then between 2 am and 6 am. Or the processing unit 42 may derive a usage profile that causes the filtration system to be in an actuated state for a solid 8 hrs between 10 pm and 6 am. The derived usage profile may also cause the heating module to be in an actuated state intermittently for 20 minutes on and 20 minutes off between the hours of 6 pm and 6 am during the weekdays. Alternatively, the derived usage profile may cause the heating module to be in an actuated state intermittently for 1 hr on and 2 hrs off between the hours of 6 pm and 6 am during the weekdays.

In the example given above, the operating parameters for the energy savings mode indicated that the actuated state should occur during the off-peak time periods. It is possible that the operating parameters may not specifically outline the time period during which certain ones of the bathing unit components should be actuated. Instead, the operating parameters may simply indicate "perform filtering and heating so as to minimize energy costs". In such a case, the processing unit 42 may determine that in order to minimize energy costs, the bathing unit components should acquire the actuated state during the time periods having the least expensive energy tariff rate within the power consumption profile. The processing unit 42 may further determine the minimal amount of time that each of the bathing unit components (such as the filtration system, the heating modules, etc) can be in an activated state, while still maintaining the bathing system in decent operational condition (i.e. still clean and not too cold). The processing unit 42 may then derive the usage profile on a basis of these determinations.

It should be appreciated that the usage profile may be derived according to any possible program instructions or algorithms, so long as they take into consideration the power consumption profile and the selected energy savings module. The present invention is not limited to the specific algorithm or program instructions that are used to derive the usage profile. A person of skill in the art will appreciate that a variety of different, and acceptable, usage profiles can be derived for the same energy savings module and power consumption profile.

At step 84, once a usage profile has been derived, the processing unit 42 passes the usage profile to the controller 34, such that the controller 34 is able to cause at least some of the bathing unit components to acquire the actuated state and the non-actuated state on a basis of the derived usage profile. The controller 34 will continue to operate and regulate the bathing unit components according to the derived usage profile, until a user either manually enters new command signals for controlling one or more bathing unit components or selects a different operational mode from the set of operational modes shown in FIG. 3.

In accordance with a non-limiting embodiment, the operational mode selected by a user may only be operative for causing the operation and regulation of one or two of the bathing unit components, such as the heating module and the filtration module. In such a case, a user can enter signals via the user control interface 35 for causing the controller 34 to control other ones of the bathing unit components, such as the water jets 20 or the air blower 28, without causing any change in operation of the bathing unit components being operated on a basis of the selected operational mode.

Graphical User Interface (GUI)

In accordance with the present invention, when a user selects a given operational mode (which may be an energy savings mode), the user control interface 35 is operative for providing the user with a graphical user interface that displays at least one of the operating parameters and/or the usage profile of the selected operational mode. The operating parameters or usage profile may further be displayed in connection with the power consumption profile, such that a user is able to view how the operating parameters and/or usage profile relate to the power consumption profile.

Figure 7:
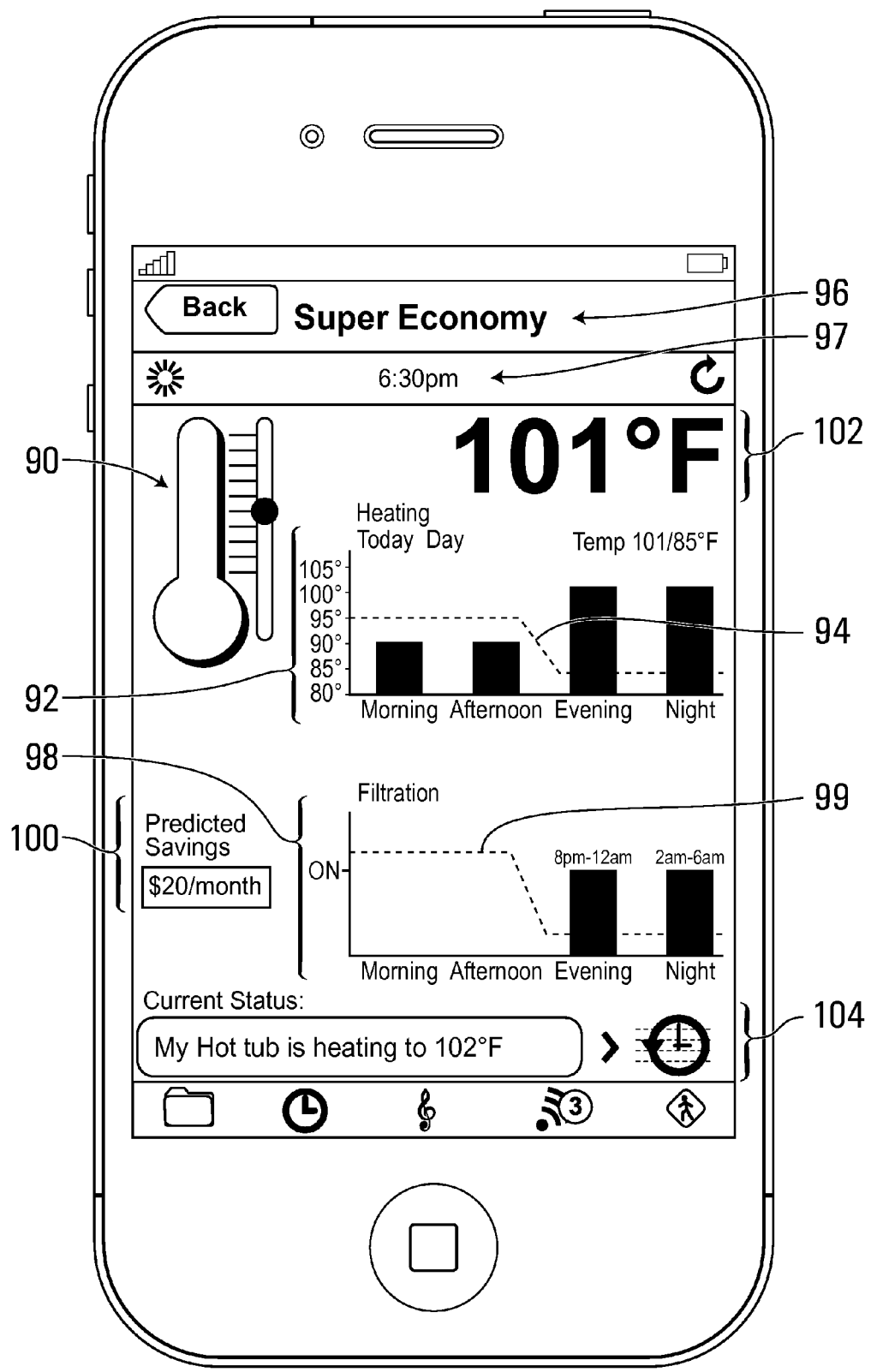
FIG. 7 shows a non-limiting example of a graphical user interface showing operational settings associated with an energy savings mode in accordance with the present invention.

Shown in FIG. 7 is a non-limiting example of a display page 90 of a graphical user interface that is operative for displaying to a user information about the selected operational mode, which in the example shown, is the "Super Economy" energy savings mode 58e. The display page 90 shows the operating parameters associated with this energy savings mode. Specifically, at information area 92 the graphical user interface displays that the temperature is operative for being kept at approximately 90° F. during the morning and afternoon, and at approximately 102° F. during the evening and night. A dotted line 94 that relates to the energy tariff rate is superposed over the temperature information. As such, a user is able to quickly see that the temperature of the bathing water is kept at a lower temperature during the more expensive energy consumption time periods and is elevated to a higher temperature during the less expensive energy consumption time periods.

At information area 98 the graphical user interface further displays that the filtering is scheduled to take place between 8-12 pm in the evening, and between 2-6 am in the morning. A dotted line 99 that relates to the energy tariff rate is superposed over the temperature information, such that a user is able to quickly see that the filtering is taking place during the less expensive energy consumption time periods.

Additional information may also be displayed by the graphical user interface. For example, within information area 96 is the title of the operational mode and at information area 97 time information is provided, which may be indicative of the current time or the amount of time the operational mode has been in operation, among other possibilities. At information area 102, an indication of the current temperature is provided and within information area 104 is an indication of an operational status of the bathing system 10. In the example shown in FIG. 7, the operational status is indicative that the bathing system is heating to a water temperature of 102° F.

Given that the operational mode displayed in FIG. 7 is an energy savings mode, the display page 90 comprises an information area 100 indicative of savings information associated with the energy savings mode. In the example shown, the savings information is indicative of a predicted savings amount resulting from the use of the "Super Economy" energy savings mode 58e. However, it should be appreciated that the savings information could be any type of information, such as dollars saved during a given time period by using the energy savings mode, a difference in energy tariff rates between the peak time period and the off-peak time period, as well as any other possible savings-related information. The savings information can be computed locally at the processing unit 40, or can be computed by a network computing entity (such as a network server), based on information provided by the processing unit 42, such as the energy savings mode being used by the bathing system 10. The savings information computed by the network computing entity is then passed back to the control system 24 for displaying to a user via the user control interface 35.

The display page 90 provides a user with a "dashboard" view of the operating characteristics of a given operational mode. By using various user input devices, a user may also be able to interact with the displayed information areas for inputting changes or amendments to the operating parameters displayed thereon.

Figure 8:
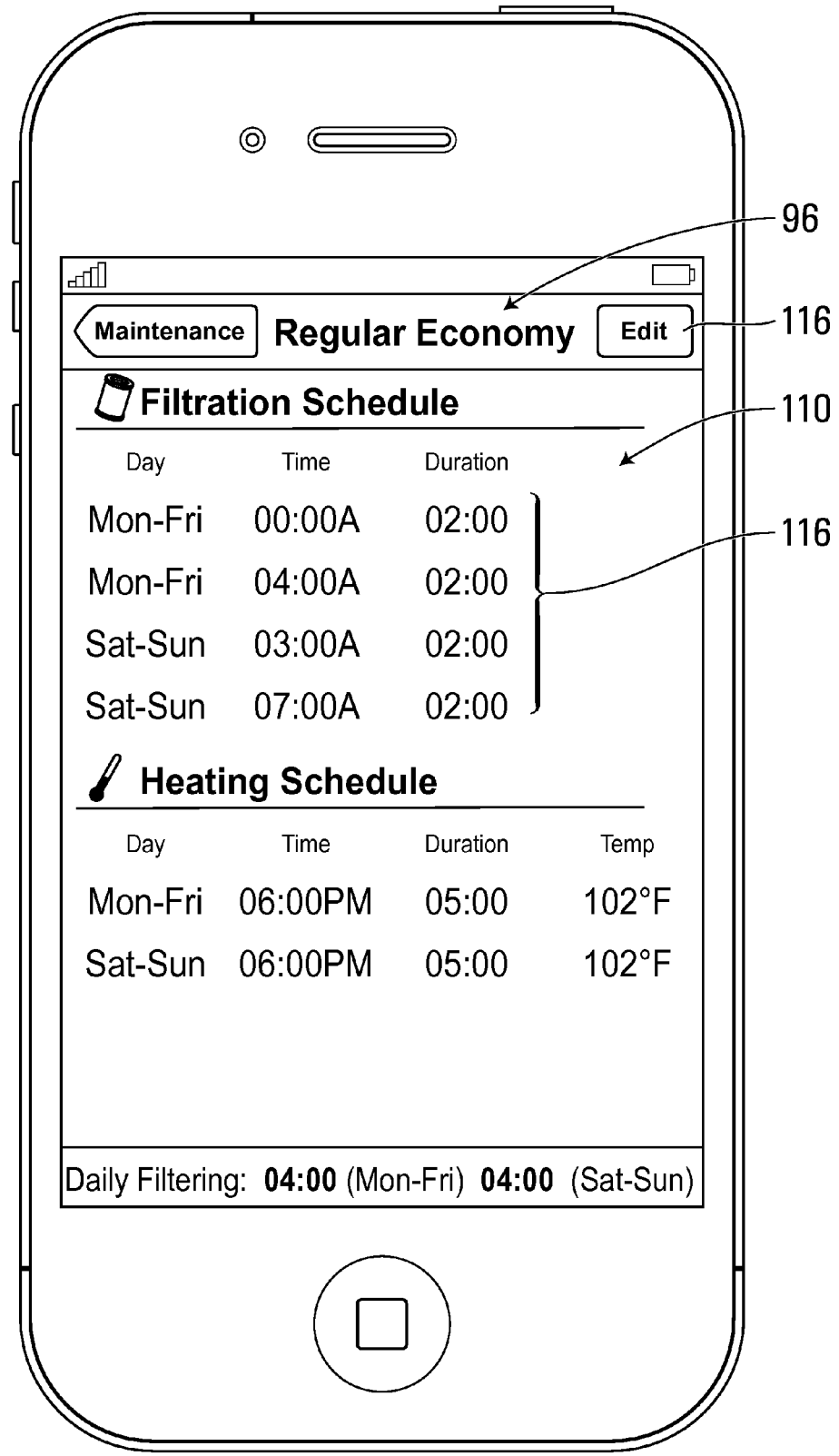
FIGS. 8 to 11 show alternative non-limiting examples of graphical user interfaces that show operational settings associated with an alternative energy savings mode, in accordance with the present invention.

Shown in FIG. 8 is a non-limiting example of a display page 110 of a graphical user interface showing a usage profile associated with an energy savings mode, which in the example shown is a "Regular Economy" mode. The usage profile shows the actuation schedule for each of the filtration system and the heating module. More specifically, the display page 110 comprises an information area 112 wherein that shows that the usage profile causes the filtration system to be activated at 00:00 am on Mondays to Fridays, for two hours, and activated again at 04:00 am on Mondays to Fridays, for two hours. The filtration system is also activated at 03:00 am on Saturdays and Sundays for two hours, and at 07:00 am on Saturdays and Sundays for two hours. This provides a total of 4 hrs of filtering per day during non-peak hours. The usage profile also shows that the heating module causes the water temperature to be at 102° F. between 6 pm and 11 pm every day.

Regardless of whether the usage profile has been pre-programmed by the bathing system manufacturer, downloaded from a third party network entity or derived locally by the processing unit 42 of the control system 24, the usage profile can be displayed to a user via a display page of the graphical user interface. In this manner, a user is able to obtain a visual overview of how one or more given bathing unit components will be operated.

Figure 9:
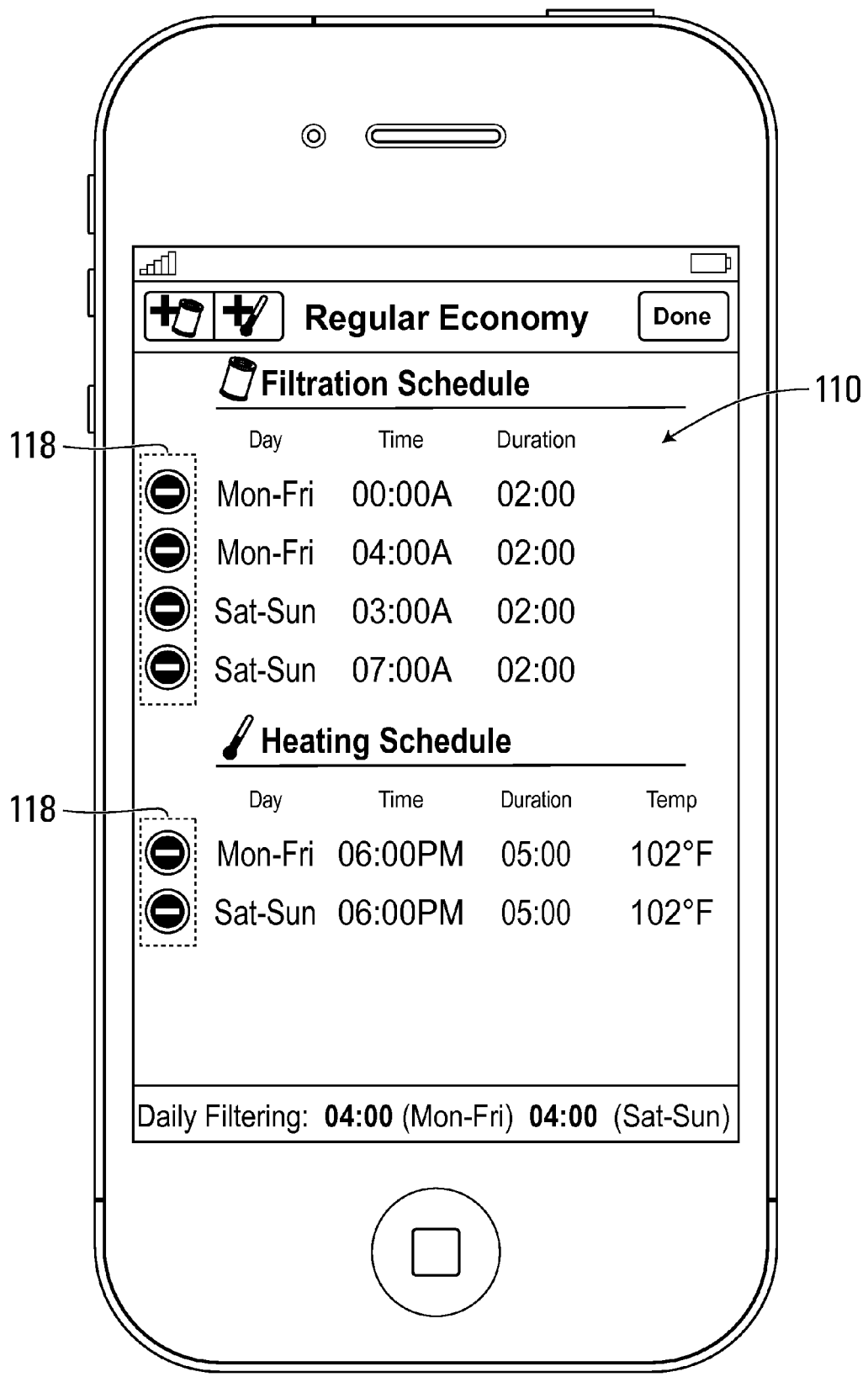
Figure 10:
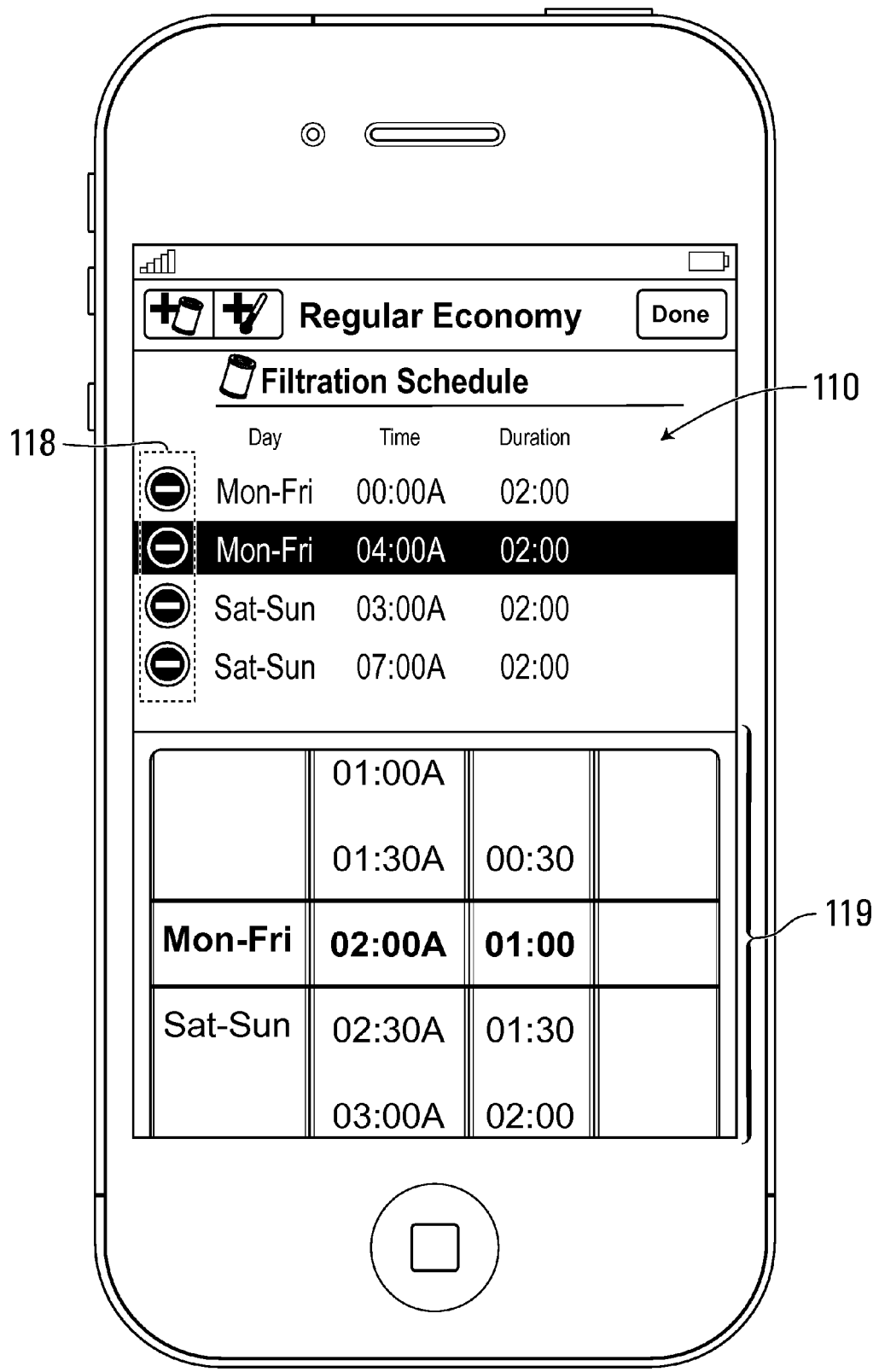

On display page 110 is an "edit" button 116 that allows a user to edit the usage profile. As shown in FIG. 9, once a user presses the "edit" button 116, display page 110 provides the user with an input area 118 (the circular icons shown in FIG. 9), to edit each of the usage profile time slots. Let us assume that the user presses the circular icon positioned next to the second Mon-Friday item within the information area 112. As shown in FIG. 10, the graphical user interface then provides the user with an input area 119 for providing the user with the ability to change both the actuation time, and the duration of time the filtration system is in the actuated state. In the embodiment shown, the input area 119 comprises a graphical representation of a rotatable cylinder of time options, however any suitable manner of allowing a user to adjust the actuation time, and the duration of time the filtration system is in the actuated state may be used. The present invention is not limited by the manner in which the graphical user interface enables a user to adjust and/or make changes to the usage profile.

Suggestion of Improved-Efficiency Operating Parameters

In accordance with the present invention, in addition to being able to cause the bathing unit components to be operated in accordance with a given operational mode, which could be an energy savings mode, a user may also manually enter different operating parameters for one or more bathing unit components.

Figure 11:
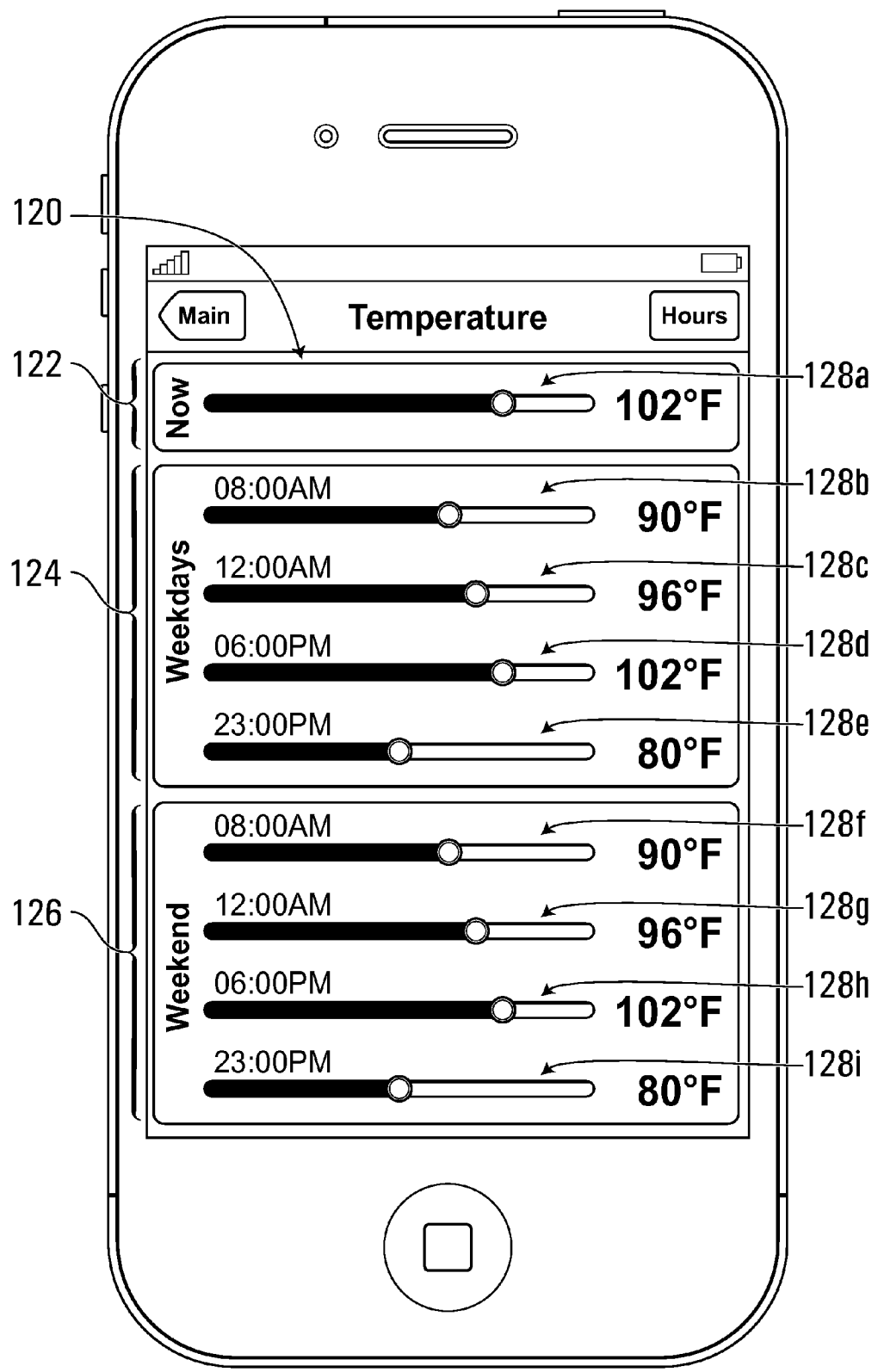

Shown in FIG. 11 is a non-limiting example of a display page 120 of a graphical user interface suitable for enabling a user to enter different operating parameters for the temperature in the water receptacle 18. The operating parameters that are entered by the user via the display page 120 will cause the controller 34 to control the operation of the heating module 30. Although not shown in the Figures, other display pages are provided by the graphical user interface for enabling a user to enter operating parameters for other bathing unit components, such as the filtration system.

It should be appreciated that the display page 120 provides the user with the ability to provide manual inputs indicative of operating parameters that can be immediately implemented, or implemented at a later time, for causing the heating module to be controlled in accordance with the input operating parameters. Or, the display page 120 may be used by a user in order to program operating parameters in association with a user-defined operational mode that can then be displayed on display page 56 shown in FIG. 3.

In the non-limiting example shown in FIG. 11, the display page 120 comprises a first information area 122 showing the temperature as it currently stands, a second information area 124 showing the desired temperatures that have been set for different weekday time periods and a third information area 126 showing the desired temperatures that have been set for different weekend time periods. The display page 120 further comprises input areas 128a-i, which in the embodiment shown are slide scales that can be adjusted by a user in order to adjust the set temperatures (operating parameters) for the different time periods.

When a user enters a desired operating parameter associated with a bathing unit component, it is possible that the desired operating parameter is not necessarily a good operating parameter from an energy efficiency standpoint. It is possible that by slightly tweaking or adjusting the user's desired operating parameter, which could involve reducing a desired temperature by 1 or 2 degrees, starting the activation of the heating module half an hour later than a desired activation time or slightly reducing the desired speed of a water jet, improved energy efficiency may be achieved. It should be appreciated that the above examples are strictly for illustration, and are not in any way meant to limit the scope of the present invention.

Therefore, in accordance with the present invention, the processing unit 42 is operative for receiving a user's desired operating parameters, and when possible, suggesting an improved-efficiency operating parameter that will be more cost efficient or more energy efficient. This will be described in more detail with reference to the display page 120 shown in FIG. 11 and the flow chart shown in FIG. 12.

For the sake of example, let us assume that a user interacts with the display page 120 of the graphical user interface for providing operating parameters associated with the heating module 30. It will be appreciated that the operating parameter could be for any bathing unit component of the bathing system 10, however, for the purposes of this example, the desired operating parameter will be for the heating module 30. More specifically, let us assume that the user interacts with display page 120 by adjusting the sliding scale of input area 128d such that the operating parameter for the heating module 30 for weekdays between 6:00 pm-11:00 pm is set such that the water temperature in the water receptacle acquires a temperature of 102° F. This is done by using a user input device (which in the present case is a touch sensitive screen) of the user control interface 35 on which the graphical user interface is displayed.

Figure 12:
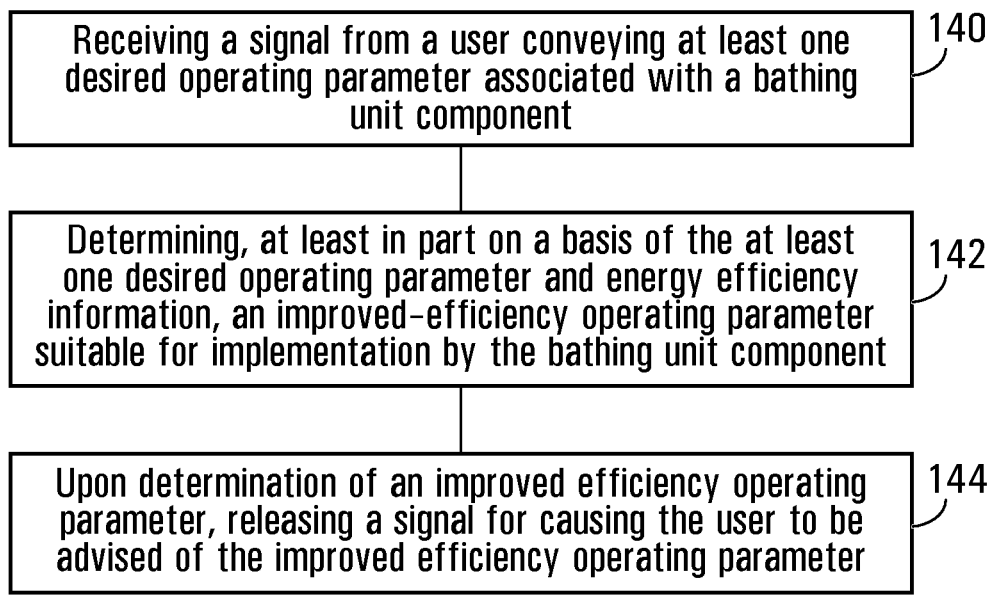
FIG. 12 shows a flow diagram of a method for deriving an improved-efficiency operating parameter, according to a non-limiting example of the present invention.

Once a user has provided this input, at step 140 shown in FIG. 12, the processing unit 40 receives a signal conveying the desired operating parameter associated with the bathing unit component, which in this case conveys that the water temperature in the water receptacle should acquire a temperature of 102° F. on weekdays between 6:00 pm-11:00 pm.

At step 142, the processing unit 40 then determines, at least in part on a basis of this desired operating parameter and energy efficiency information an improved-efficiency operating parameter suitable for implementation by the bathing unit component, which in this case is the heating module 30. The energy efficiency information may be indicative of an power consumption profile associated with the energy provider 26. As such, the energy efficiency information may provide an indication of different energy tariff rates with respect to time.

The energy efficiency information may also provide real-time temperature readings, such as the current ambient outside temperature.

In addition, the energy efficiency information may be indicative of the amount of power consumption required in order to achieve a given operating parameter for a particular bathing unit component. For example, the energy efficiency information may provide an indication of the amount of energy consumption required to operate the water jets at each of a low setting, a medium setting and a high setting. Or the energy efficiency information may be indicative of the power consumption required to raise the water temperature by a certain number of degrees, by providing an associated power consumption required to raise the temperature by 1°, by 2°, by 3°, etc. The above examples are strictly for illustration purposes, and it should be appreciated that the energy efficiency information could provide a variety of different information.

Although not shown in FIG. 4, the energy efficiency information may be stored in the memory unit 42 of the control system 10. Alternatively, it may be stored within a memory unit of a remote computing device that implements the user control interface 35. In yet a further alternative, the energy efficiency information is located at a remote device (such as the power meter 38 or a network server) such that it can be obtained over a network connection, using zigbee, plc (power line com), wimax or wifi.

On a basis of the one or more desired operating parameters and the energy efficiency information, the processing unit is able to determine if there is an improved-efficiency operating parameter. The improved-efficiency operating parameter may provide improved efficiency either in terms of requiring less power consumption, or in terms of consuming the power during a period with a less expensive energy tariff rate. For the sake of example, let us assume that the user entered the desired operating parameter via the slide scale of input area 128d, wherein the user raised the set temperature from 94° to 102°, as shown in FIG. 11. As such, the desired operating parameter requires that the water temperature be increased by 8° (from 94° to 102°). On a basis of the energy efficiency information, the processing unit 40 may determine that the power consumption required to increase the water temperature by 8° is 40% more than the power consumption required to increase the water temperature by 7°. Accordingly, the processing unit 40 may determine that an improved-efficiency operating parameter may be to set the water temperature to acquire a temperature of 101° instead of 102°, which could allow the user to consume 40% less energy.

As an alternative example, let us assume that the user entered the desired operating parameter via the slide scale of input area 128c, wherein the user raised the set temperature from 90° to 96° during the weekday time period between 12:00 am and 6:00 pm, as shown in FIG. 11. In this scenario, the processing unit 40 may determine that on the basis of the energy efficiency information, which in this example is an power consumption profile, that it may be desirable to delay increasing the water temperature until 4 pm, at which point the power consumption profile may indicate a drop in the energy tariff rate. As such, the improved-efficiency operating parameter determined by the processing unit 40 will be to delay activation of the temperature increase until a later time, which is subject to an off-peak energy tariff rate.

Other non-limiting examples of improved-efficiency operating parameters, may include:
  may suggest that one or more of the pumps be deactivated, or that a pump setting be reduced;
  that a different operational setting (such as one of the energy savings modes) is selected;

In an alternative embodiment, the processing unit 40 may provide a user with a plurality of improved-efficiency options at the same time.

It is noted that a specific mathematical algorithm or program instructions for determining or computing one or more improved-efficiency operating parameters, is not critical to the invention. Any suitable algorithm or program instructions that would provide an improved-efficiency operating parameter could be used within the context of the present invention.

At step 144, upon determination of an improved-efficiency operating parameter, the processing unit 40 releases a signal for causing the user to be advised of the improved-efficiency operating parameter that has been determined. The user may be advised of the improved-efficiency operating parameter via an information area on a display page of the graphical user interface, a pop-up box displayed by the graphical user interface, an email, an SMS, or an audio output, among other possibilities.

In addition to advising a user of the improved-efficiency operating parameter, the processing unit 40 may further request authorization from a user to implement the improved-efficiency operating parameter. This will result in the improved-efficiency operating parameter replacing the user's desired operating parameter. In this manner, a user is provided with suggestions, and in some cases options, for reducing the energy consumption or the cost of energy consumption associated with running the bathing system 10.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A method for use in connection with a bathing system, the bathing system comprising a set of bathing unit components including a heating module and a filtration system adapted for acquiring an actuated state and a non-actuated state, the bathing system adapted to receive power from an energy provider that supplies power in accordance with a power consumption profile, the method comprising:
  a) displaying on a display screen a plurality of water care modes selectable by a user of the bathing system, the plurality of water care modes displayed including at least two distinct energy savings modes associated with respective operating parameters for the filtration system;
  b) receiving, at a processing entity, an indication of an energy savings mode selected from the at least two distinct energy savings mode displayed on the display screen;
  c) following receipt of the selected energy savings mode:
    i. using the processing entity to derive a usage profile associated with the filtration system, the derived usage profile being dependent upon the selected energy savings mode and the power consumption profile of the energy provider, the usage profile associated with the filtration system conveying periods of time during which the filtration system is to acquire one of the actuated state and the non-actuated states;
    ii. causing the filtration system to acquire one of the actuated state and the non-actuated state based on the derived usage profile associated with the filtration system.

2. A method as defined in claim 1, wherein the operating parameters for the filtration system associated with the energy savings modes convey time durations for which the filtration system is to acquire the actuated state.

3. A method as defined in claim 2, wherein the at least two distinct energy savings modes are associated with respective operating parameters for:
  a) the filtration system; and
  b) the heating module.

4. A method as defined in claim 3, wherein the operating parameters for the heating module associated with the energy savings modes convey water temperature settings.

5. A method as defined in claim 4, said method comprising, following receipt of the selected energy savings mode:
  (i) using the processing entity to derive a usage profile associated with the heating module, the derived usage profile associated with the heating module being dependent upon the selected energy savings mode and the power consumption profile of the energy provider, the usage profile associated with the heating module conveying periods of time during which the heating module is permitted to acquire the actuated state;
  (ii) causing the heating module to acquire one of the actuated state and the non-actuated state based on the derived usage profile associated with the heating module.

6. A method as defined in claim 2, wherein the operating parameters for the filtration system associated with the at least two distinct energy savings modes are configured by a manufacturer of the bathing system.

7. A method as defined in claim 2, wherein the operating parameters for the filtration system associated with the at least two distinct energy savings modes are specified by the user of the bathing system using an input device in communication with the processing entity.

8. A method as defined in claim 1, wherein the periods of time during which the filtration system is to acquire one of the actuated state and the non-actuated states are further established at least in part based on noise level considerations.

9. A method as defined in claim 8, wherein the noise level considerations are specified by the user of the bathing system using an input device in communication with the processing entity.

10. A method as defined in claim 1, wherein the power consumption profile conveys a peak consumption period and an off-peak consumption period, the derived usage profile causing the filtration system to only acquire the actuated state during the off-peak consumption period.

11. A method as defined in claim 1, wherein the power consumption profile conveys a peak consumption period and an off-peak consumption period, wherein a majority of time that the usage profile causes the filtration system to acquire the actuated state occurs during the off-peak consumption period.

12. A method as defined in claim 1, wherein information regarding the power consumption profile is received by the processing entity from a power meter in communication with a power source that provides power to the bathing system.

13. A method as defined in claim 1, wherein the power consumption profile conveys energy costs in relation to respective time periods.

14. A method as defined in claim 1, wherein the power consumption profile is stored in a memory unit of the bathing system.

15. A method as defined in claim 1, further comprising obtaining the power consumption profile from a network entity via a network connection.

16. A method as defined in claim 1, wherein the at least two distinct energy savings modes include a first energy savings mode and a second energy savings mode, the first energy savings mode being associated with operating parameters for the filtration system different from operating parameters associated with the second energy savings mode.

17. A method as defined in claim 1, wherein using the processing entity to derive the usage profile associated with the filtration system includes processing the energy savings mode selected by the user in combination with the power consumption profile of the energy provider to derive the periods of time during which the filtration system is to acquire one of the actuated state and the non-actuated states.

18. A device for use in connection with a bathing system, the bathing system including a set of bathing unit components comprising a heating module and a filtration system adapted for acquiring an actuated state and a non-actuated state, the bathing system adapted to receive power from an energy provider that supplies power in accordance with a power consumption profile, the device comprising:
  a) a display screen;
  b) an input interface for enabling a user to provide information for controlling the bathing system;
  c) a processing entity in communication with the display screen and the input interface, the processing entity being programmed for:
    i. displaying on the display screen a plurality of water care modes selectable by a user of the bathing system through the input interface, the plurality of water care modes displayed including at least two distinct energy savings modes associated with respective operating parameters for the filtration system;
    ii. receiving from input interface an indication of an energy savings mode selected by the user from the at least two distinct energy savings mode displayed on the display screen;
    iii. following receipt of the selected energy savings mode:
      (a) deriving a usage profile associated with the filtration system, the derived usage profile being dependent upon the selected energy savings mode and the power consumption profile of the energy provider, the usage profile associated with the filtration system conveying periods of time during which the filtration system is to acquire one of the actuated state and the non-actuated states;
      (b) releasing a signal for causing the filtration system to acquire one of the actuated state and the non-actuated state based on the derived usage profile associated with the filtration system;
      iv. an output releasing the signal for causing the filtration system to acquire one of the actuated state and the non-actuated state.

19. A device as defined in claim 18, wherein the operating parameters for the filtration system associated with the energy savings modes convey time durations for which the filtration system is to acquire the actuated state.

20. A device as defined in claim 19, wherein the at least two distinct energy savings modes are associated with respective operating parameters for:
  a) the filtration system; and
  b) the heating module.

21. A device as defined in claim 20, wherein the operating parameters for the heating module associated with the energy savings modes convey water temperature settings.

22. A device as defined in claim 19, wherein the operating parameters for the filtration system associated with the at least two distinct energy savings modes are configured by a manufacturer of the bathing system.

23. A device as defined in claim 19, wherein the operating parameters for the filtration system associated with the at least two distinct energy savings modes are modifiable by the user of the bathing system through the input interface of the device.

24. A device as defined in claim 18, wherein the periods of time during which the filtration system is to acquire one of the actuated state and the non-actuated states are further established at least in part based on noise level considerations.

25. A device as defined in claim 24, wherein the noise level considerations are specified by the user of the bathing system through the input interface.

26. A device as defined in claim 18, wherein the power consumption profile conveys a peak consumption period and an off-peak consumption period, the derived usage profile causing the filtration system to only acquire the actuated state during the off-peak consumption period.

27. A device as defined in claim 18, wherein the power consumption profile conveys a peak consumption period and an off-peak consumption period, wherein a majority of time that the usage profile causes the filtration system to acquire the actuated state occurs during the off-peak consumption period.

28. A device as defined in claim 18, wherein information regarding the power consumption profile is received by the processing entity from a power meter in communication with a power source that provides power to the bathing system.

29. A device as defined in claim 18, wherein the power consumption profile conveys energy costs in relation to respective time periods.

30. A device as defined in claim 18, wherein the device comprises a memory unit, the memory unit storing the power consumption profile.

31. A device as defined in claim 18, further comprising obtaining the power consumption profile from a network entity via a network connection.

32. A device as defined in claim 18, wherein the at least two distinct energy savings modes include a first energy savings mode and a second energy savings mode, the first energy savings mode being associated with operating parameters for the filtration system different from operating parameters associated with the second energy savings mode.

33. A device as defined in claim 18, wherein the processing entity is programmed for deriving the usage profile associated with the filtration system at least in part by processing the energy savings mode selected by the user in combination with the power consumption profile of the energy provider to derive the periods of time during which the filtration system is to acquire one of the actuated state and the non-actuated states.

34. A control system suitable for controlling a set of bathing unit components in a bathing system, the bathing system adapted to receive power from an energy provider that supplies power in accordance with a power consumption profile, the control system comprising:
   a) a user control interface having a display screen and an input interface for enabling a user to provide information for controlling the bathing system;
   b) a bathing unit controller in communication with the user control interface, the bathing unit controller being configured for:
      i. displaying on the display screen a plurality of water care modes selectable by a user of the bathing system, the plurality of water care modes displayed including at least two distinct energy savings modes associated with respective operating parameters for the filtration system;
      ii. receiving from the user control interface an indication of an energy savings mode selected by the user from the at least two distinct energy savings mode displayed on the display screen;
      iii. following receipt of the selected energy savings mode:
         (a) deriving a usage profile associated with the filtration system, the derived usage profile being dependent upon the selected energy savings mode and the power consumption profile of the energy provider, the usage profile associated with the filtration system conveying periods of time during which the filtration system is to acquire one of the actuated state and the non-actuated states;
         (b) causing the filtration system to acquire one of the actuated state and the non-actuated state based on the derived usage profile associated with the filtration system.

35. A method for use in connection with a bathing system, the bathing system comprising a set of bathing unit components including a heating module and a filtration system adapted for acquiring an actuated state and a non-actuated state, the method comprising:
   a) displaying on a display screen at least two water care modes selectable by a user of the bathing system, the at least two water care modes displayed including at least one noise level control mode associated with specific noise level considerations;
   b) receiving, at a processing module, an indication of a selected noise level control mode from the at least one noise level control mode displayed on the display screen;
   c) following receipt of the selected noise level control mode:
      i. using the processing module to process the selected noise-level control mode to derive a usage profile associated with the filtration system, the usage profile associated with the filtration system conveying periods of time during which the filtration system is to acquire one of the actuated state and the non-actuated states, the periods of time during which the filtration system is to acquire the actuated state being conditions based upon the specific noise level considerations associated with the selected noise-level control mode;
      ii. causing the filtration system to acquire one of the actuated state and the non-actuated state based on the derived usage profile associated with the filtration system.

36. A method as defined in claim 35, wherein the specific noise level considerations associated with the noise level control mode convey a time period during which it is desired to reduce an amount of noise created by the bathing system.

37. A method as defined in claim 36, wherein the derived usage profile causes the filtration system to acquire the non-actuated state during the time period during which it is desired to reduce the amount of noise created by the bathing system.

* * * * *